(12) United States Patent
Shiota et al.

(10) Patent No.: US 11,292,683 B2
(45) Date of Patent: Apr. 5, 2022

(54) MEDIUM FEEDING DEVICE AND IMAGE READING APPARATUS

(71) Applicant: SEIKO EPSON CORPORATION, Tokyo (JP)

(72) Inventors: Takayuki Shiota, Kitakyushu (JP); Kazutoshi Nishida, Kitakyushu (JP); Kiyotaka Nakamura, Kitakyushu (JP)

(73) Assignee: Seiko Epson Corporation, Tokyo (JP)

( * ) Notice: Subject to any disclaimer, the term of this patent is extended or adjusted under 35 U.S.C. 154(b) by 131 days.

(21) Appl. No.: 16/146,889

(22) Filed: Sep. 28, 2018

(65) Prior Publication Data
US 2019/0100396 A1 Apr. 4, 2019

(30) Foreign Application Priority Data

Sep. 29, 2017 (JP) .............................. JP2017-191025

(51) Int. Cl.
*B65H 7/06* (2006.01)
*B65H 7/12* (2006.01)
(Continued)

(52) U.S. Cl.
CPC ................ *B65H 7/12* (2013.01); *B65H 3/06* (2013.01); *B65H 3/063* (2013.01); *B65H 3/0653* (2013.01); *B65H 7/06* (2013.01); *H04N 1/00602* (2013.01); *H04N 1/00681* (2013.01); *H04N 1/00694* (2013.01); *H04N 1/00702* (2013.01); *H04N 1/00718* (2013.01); *H04N 1/00734* (2013.01); *H04N 1/00755* (2013.01); *H04N 1/00777* (2013.01); *H04N 1/3263* (2013.01); *B65H 2402/46* (2013.01); *B65H 2511/22* (2013.01);
(Continued)

(58) Field of Classification Search
CPC ....... B65H 2511/528; B65H 7/00; B65H 7/06
See application file for complete search history.

(56) References Cited

U.S. PATENT DOCUMENTS 4,540,170 A * 9/1985 Masuda ................... B65H 7/06
271/259
8,870,181 B2 * 10/2014 Morikawa ................ B65H 5/00
271/169
(Continued)

FOREIGN PATENT DOCUMENTS

JP 06205765 A * 7/1994 ............. A61B 6/548
JP 2002186070 A * 6/2002
(Continued)

OTHER PUBLICATIONS

European Search Report issued in Application No. 18197536 dated Feb. 14, 2019.

*Primary Examiner* — Howard J Sanders
(74) *Attorney, Agent, or Firm* — Workman Nydegger

(57) ABSTRACT

A medium feeding device includes a medium placing portion, a feeding roller that feeds paper, a medium movement detecting portion that is positioned on a placing region of the paper of the medium placing portion in a medium feeding direction and is capable of detecting movement of the paper being fed in a width direction intersecting the medium feeding direction, and a controller that stops feeding of the paper in a case in which a physical quantity relating to movement of paper in the width direction exceeds a predetermined threshold based on a detected result by the medium movement detecting portion.

9 Claims, 21 Drawing Sheets

(51) Int. Cl.
*H04N 1/00* (2006.01)
*B65H 3/06* (2006.01)
*H04N 1/32* (2006.01)

(52) U.S. Cl.
CPC ...... *B65H 2513/10* (2013.01); *B65H 2513/20* (2013.01); *B65H 2513/40* (2013.01); *B65H 2513/41* (2013.01); *B65H 2513/512* (2013.01); *B65H 2553/414* (2013.01); *B65H 2557/242* (2013.01); *B65H 2601/255* (2013.01); *B65H 2701/1829* (2013.01); *B65H 2701/18292* (2013.01); *B65H 2801/39* (2013.01)

(56) References Cited

U.S. PATENT DOCUMENTS

| | | | |
|---|---|---|---|
| 10,469,688 B2 * | 11/2019 | Xie | H04N 1/00777 |
| 2006/0159471 A1 | 7/2006 | Yasukawa et al. | |
| 2008/0265497 A1 * | 10/2008 | Kimura | B65H 7/06 |
| | | | 271/228 |
| 2008/0279574 A1 | 11/2008 | Yasukawa et al. | |
| 2010/0258997 A1 | 10/2010 | Lee et al. | |

FOREIGN PATENT DOCUMENTS

| | | |
|---|---|---|
| JP | 2006-193286 A | 7/2006 |
| JP | 2017-061375 | 3/2017 |

\* cited by examiner

FIG. 10
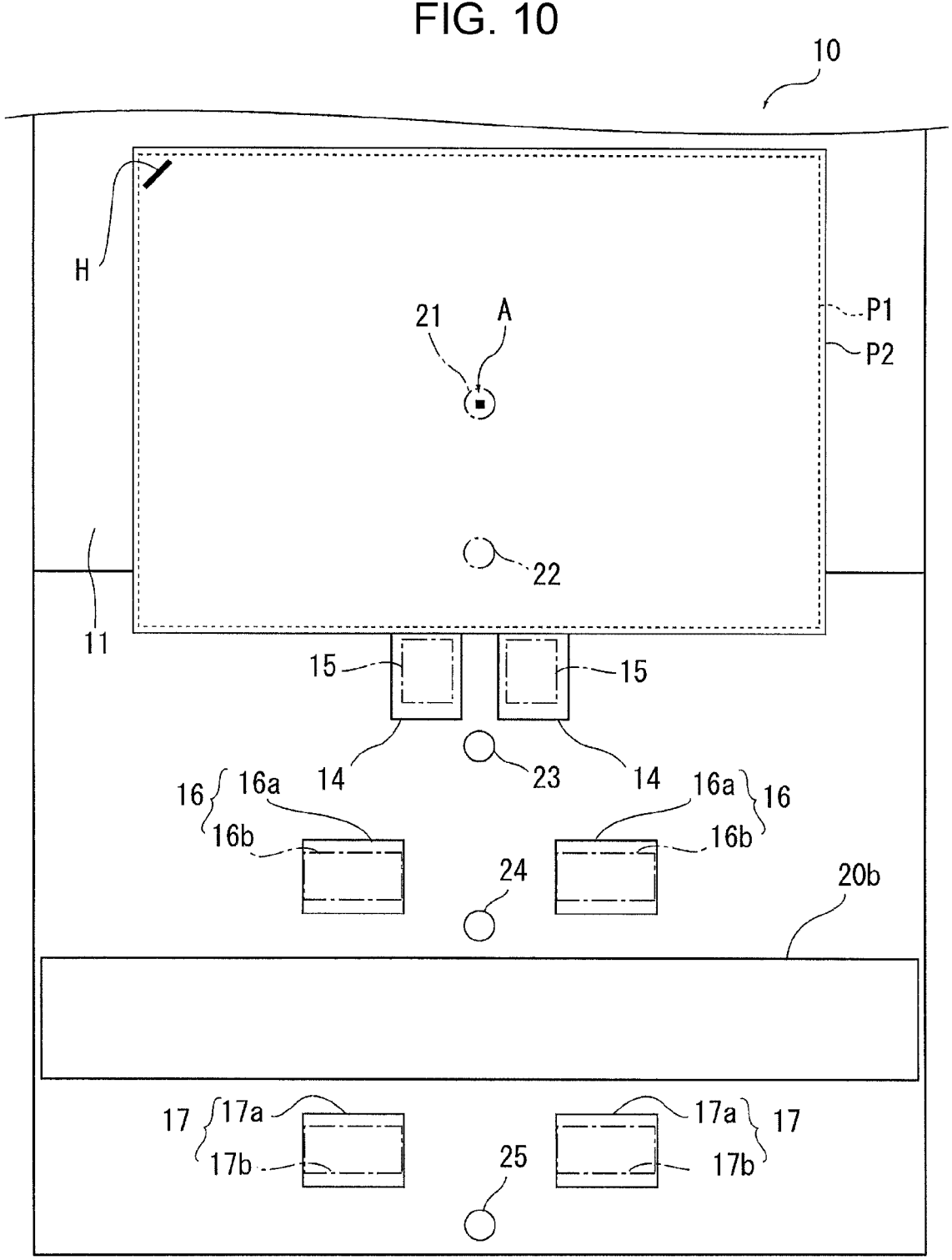
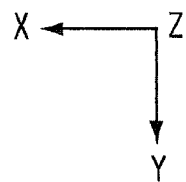

FIG. 17
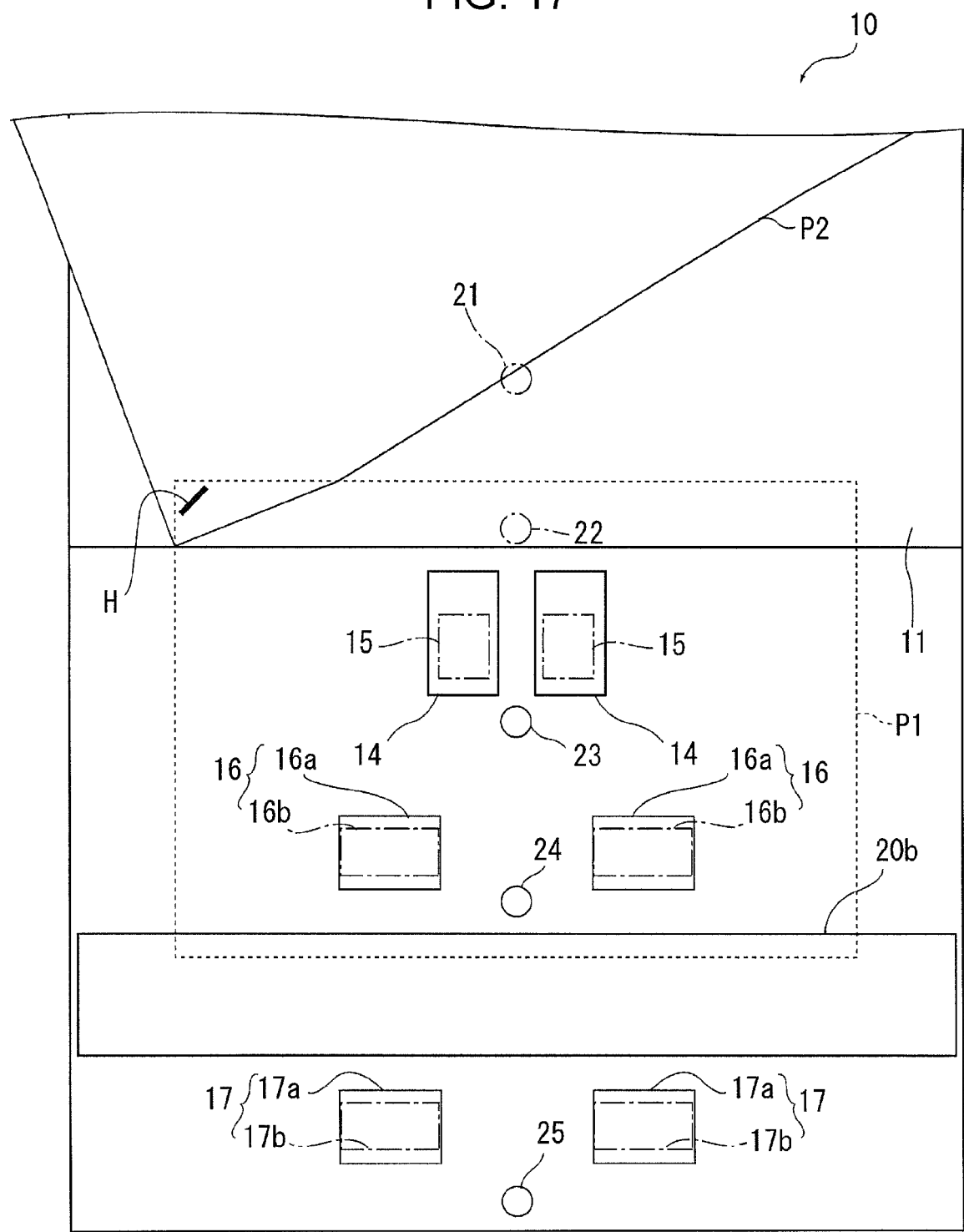
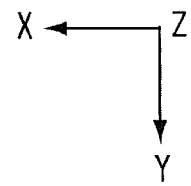

MEDIUM FEEDING DEVICE AND IMAGE READING APPARATUS

BACKGROUND

1. Technical Field

The present invention relates to a medium feeding device which feeds an original document and an image reading apparatus which reads the original document being fed by the medium feeding device.

2. Related Art

In a scanner which is an example of an image reading apparatus, a medium feeding device (also referred to as automatic document feeder (ADF) which automatically feeds an original document as a medium is provided, and the scanner may be configured to automatically feed and read a plurality of original documents.

Also, the medium feeding device may include an original document tray in which the plurality of original documents is placed on a placing surface and a feeding roller which feeds the original documents by coming into contact with the original document set on the original document tray and being rotated.

In such a medium feeding device, a jam detecting portion which detects a paper jam (clogging) being generated at the time of feeding the original documents by the feeding roller may be provided (for example, JP-A-2006-193286).

The jam detecting portion provided in the medium feeding device disclosed in JP-A-2006-193286 includes a transportation amount measuring portion which measures a transportation amount of a medium being fed by the feeding roller and a medium detecting portion which is provided on a downstream side of the transportation amount measuring portion, and is configured to detect a paper jam in a case in which the medium detecting portion does not detect the medium even when the amount measured by the transportation amount measuring portion exceeds a predetermined amount. The transportation amount measuring portion measures rotation amounts of the other rollers which are rotated in the same direction as the feeding roller or the feeding roller.

However, an original document bundle in which a plurality of original documents is bound by a stapler may be erroneously placed on the original document tray of the medium feeding device.

For example, in a case in which one corner of the original document bundle is bound, there is a concern that a binding portion is pulled when a first sheet of the original document bundle is fed so that not only the first sheet of the original document but also subsequent sheets to a second sheet thereof may be damaged. Therefore, it is necessary to early detect feeding of stapled original documents.

However, in a case in which a paper jam generated in the stapled original document bundle is detected by the jam detecting portion disclosed in JP-A-2006-193286, the feeding roller is needed to be driven at least until the original documents reach the medium detecting portion (provided on downstream side of feeding roller), and thus there is a concern that a damage to be generated in the original document may increase.

SUMMARY

An advantage of some aspects of the invention is to early detect a transportation failure of an original document in a medium feeding device or an image reading apparatus including the medium feeding device.

According to an aspect of the invention, there is provided a medium feeding device including a medium placing portion on which a medium is placed, a feeding roller that feeds the medium placed on the medium placing portion by coming into contact with a surface of the medium facing the medium placing portion and being rotated, a medium movement detecting portion that is positioned in a placing region of the medium on the medium placing portion on an upstream side of the feeding roller in a medium feeding direction and is capable of detecting movement of the medium being fed by the feeding roller in a width direction intersecting the medium feeding direction, and a controller that stops feeding of the medium in a case in which a physical quantity relating to the movement of the medium in the width direction exceeds a predetermined threshold based on a detected result by the medium movement detecting portion.

In this specification, the "job" in the medium feeding device means a work relating to an operation of feeding the medium in the medium feeding device, and the medium is stopped to be fed when the job is stopped.

In the configuration, since the controller stops the job in a case in which the physical quantity relating to the movement of the medium in the width direction exceeds a predetermined threshold based on the detected information by the medium movement detecting portion positioned on the upstream side of the feeding roller in the medium feeding direction, it is possible to early detect the movement of the medium in the width direction lead to a transportation failure of the medium and to suppress a damage to be generated in the medium. Also, as "the physical quantity relating to the movement", for example, a movement distance, a moving speed, an acceleration rate, and the like are exemplified.

In the medium feeding device, a pair of the medium movement detecting portions may be provided with a gap therebetween in the width direction, the pair of medium movement detecting portions may be respectively set as a first medium movement detecting portion and a second medium movement detecting portion, and the controller may stop the feeding of the medium in a case in which a difference between a physical quantity relating to movement of the medium in the width direction being detected by the first medium movement detecting portion and a physical quantity relating to movement of the medium in the width direction being detected by the second medium movement detecting portion exceeds a predetermined threshold.

In the configuration, since the pair of the medium movement detecting portions is provided with a gap therebetween in the width direction, and the controller stops the job in a case in which the difference between the physical quantity relating to the movement of the medium in the width direction being detected by the first medium movement detecting portion and the physical quantity relating to the movement of the medium in the width direction being detected by the second medium movement detecting portion exceeds a predetermined threshold, it is possible to detect a transportation failure of the medium, particularly, rotation of the medium, and to more reliably suppress a damage to be generated in the medium.

According to another aspect of the invention, there is provided a medium feeding device including a medium placing portion on which a medium is placed, a feeding roller that feeds the medium placed on the medium placing portion by coming into contact with a surface of the medium facing the medium placing portion and being rotated, a medium movement detecting portion that is positioned in a placing region of the medium on the medium placing portion on an upstream side of the feeding roller in a medium feeding direction and is capable of detecting movement of the medium being fed by the feeding roller in the medium feeding direction, and a controller that stops feeding of the medium in a case in which a stop section is shorter than a predetermined first threshold when a moving section, the stop section, and a moving section of the medium in the medium feeding direction are detected by the medium movement detecting portion in this order by receiving a detected result by the medium movement detecting portion.

The "stop section" of the medium in the medium feeding direction is a section where the movement of the paper is not detected by the medium movement detecting portion, and in addition to a case in which the medium movement detecting portion detects paper in a stop state of not being moved, a case in which the movement of the paper is not detected because there is no paper is also included in the stop section.

In the configuration, based on the detected information by the medium movement detecting portion positioned on the upstream side of the feeding roller in the medium feeding direction, in a case in which the stop section is shorter than a predetermined threshold when the medium movement detecting portion detects the moving section, the stop section, and the moving section of the medium in the medium feeding direction in this order, that is, the controller early detects a feeding state (for example, a state in which a subsequent medium along with a fed previous medium is unintendedly fed due to a binding portion of a stapled medium bundle) which is not detected in a normal state and stops the job, and thus it is possible to suppress a damage to be generated in the medium at the time of generating a transportation failure.

Also, in this specification, the "section" of the moving section and the stop section means a time or a gap sectioned by a distance (length).

In the medium feeding device, the controller may be capable of referring to the second threshold that is shorter than the first threshold, and may continue feeding of the medium in a case in which the stop section is equal to or less than the second threshold.

In a case in which a hole formed by a punching or the like is present in the medium being fed, since a subsequent medium (referred to as subsequent medium) on a medium being fed (referred to as previous medium) is detected by the medium movement detecting portion in a part corresponding to the hole, apparently, the medium movement detecting portion detects stop of the medium. Also, when the part corresponding to the hole passes through, the medium movement detecting portion detects the movement of the previous medium again.

Generally, since the hole formed by punching or the like is small, a section where the medium movement detecting portion detects the stop state of the medium in the part corresponding to the hole is a significantly short section, and the section is shorter than the first threshold for detecting the feeding (transportation failure) of the stapled medium bundle described above. Therefore, when the controller performs controlling with reference to only the first threshold, even normal feeding of the medium having the hole is set to a transportation failure, and thus a job is stopped.

In the configuration, since the controller is capable of referring the second threshold shorter than the first threshold, and continues the job in a case in which the stop section is equal to or smaller than the second threshold, it is possible to suppress a false detection in which feeding of the medium having a small hole such as a punch hole is determined as a feeding abnormality.

In the medium feeding device, the medium movement detecting portion may be configured to be capable of detecting both movement of the medium in the medium feeding direction and movement in a width direction intersecting the medium feeding direction, and the controller may stop feeding of the medium in a case in which a physical quantity relating to the movement of the medium in the width direction exceeds a predetermined third threshold based on the detected result by the medium movement detecting portion.

In the configuration, since the controller receives the detected information by the medium movement detecting portion and stops a job in a case in which the physical quantity relating to the movement of the medium in the width direction exceeds the predetermined third threshold, in addition to an action effect described above, it is possible to early detect the movement of the medium in the width direction lead to a transportation failure of the medium and to more reliably suppress a damage to be generated in the medium.

In the medium feeding device, the feeding roller may be provided in a center region of the medium in the width direction intersecting the medium feeding direction, and one medium movement detecting portion may be provided in the center region in the width direction.

In the configuration, any one of the configurations described above is realized in a so-called medium feeding device in a center paper feeding manner in which the feeding roller is provided in the center region of the medium in the width direction intersecting the medium feeding direction by providing one medium movement detecting portion in the center region in the width direction.

In the medium feeding device, a pair of the medium movement detecting portions may be provided with a gap therebetween in the width direction intersecting the medium feeding direction, the pair of the medium movement detecting portions may be respectively set as a first medium movement detecting portion and a second medium movement detecting portion, and the controller may stop a job in a case in which a difference between the stop section being detected by the first medium movement detecting portion and the stop section being detected by the second medium movement detecting portion exceeds a predetermined threshold.

In the configuration, in a so-called medium feeding device in a center paper feeding manner in which the feeding roller is provided in the center region of the medium in the width direction intersecting the medium feeding direction, the pair of the medium movement detecting portions is provided with a gap therebetween so as to be positioned on both sides of the feeding roller, and the controller stops the job in a case in which the difference between the stop section being detected by the first medium movement detecting portion and the stop section being detected by the second medium movement detecting portion exceeds a predetermined threshold, and thus it is possible to more reliably suppress a transportation failure.

According to still another aspect of the invention, there is provided a medium feeding device including a medium placing portion on which a medium is placed, a feeding roller that feeds the medium placed on the medium placing portion by coming into contact with a surface of the medium facing the medium placing portion and being rotated, a first medium movement detecting portion and a second medium movement detecting portion, as a medium movement detecting portion, that are positioned in a placing region of the medium on the medium placing portion on an upstream side of the feeding roller in the medium feeding direction, are provided with a gap therebetween in a width direction intersecting the medium feeding direction as a pair, and are capable of detecting movement of the medium being fed by the feeding roller in the medium feeding direction, and a controller that stops feeding of the medium in a case in which a difference between a physical quantity relating to movement of the medium in the medium feeding direction being detected by the first medium movement detecting portion and a physical quantity relating to movement of the medium in the medium feeding direction being detected by the second medium movement detecting portion exceeds a predetermined threshold.

In the configuration, the first medium movement detecting portion and the second medium movement detecting portion as the medium movement detecting portion, which are capable of detecting the movement of the medium in the medium feeding direction, are provided as a pair with a gap therebetween in the width direction, the controller stops the job in a case in which the difference between the physical quantity relating to the movement of the medium in the medium feeding direction detected by the first medium movement detecting portion and the physical quantity relating to the movement of the medium in the medium feeding direction detected by the second medium movement detecting portion exceeds a predetermined threshold, and thus it is possible to detect a transportation failure of the medium, particularly, rotation of the medium, and to more reliably suppress a damage to be generated in the medium.

According to still yet another aspect of the invention, there is provided an image reading apparatus including a reading unit that reads a medium, and the medium feeding device according to any one of the configurations described above that feeds the medium toward the reading unit.

In the configuration, the same effects as that of the configurations described above are obtained in the image reading apparatus including the reading unit that reads the medium and the medium feeding device that feeds the medium toward the reading unit.

BRIEF DESCRIPTION OF THE DRAWINGS

The invention will be described with reference to the accompanying drawings, wherein like numbers reference like elements.

FIG. 10 is a schematic plan view illustrating a state in which the stapled paper is placed on the medium placing portion with the clipped part thereof on an upstream side.

FIG. 17 is a schematic plan view of FIG. 14.

DESCRIPTION OF EXEMPLARY EMBODIMENTS

First Embodiment

First, an outline of an image reading apparatus according to an embodiment of the invention will be described.

As an example of the image reading apparatus according to the embodiment, a document scanner (hereinafter, simply referred to as scanner 1) capable of reading at least one surface of a front surface and a rear surface of paper as a "medium" is exemplified.

Figure 1:
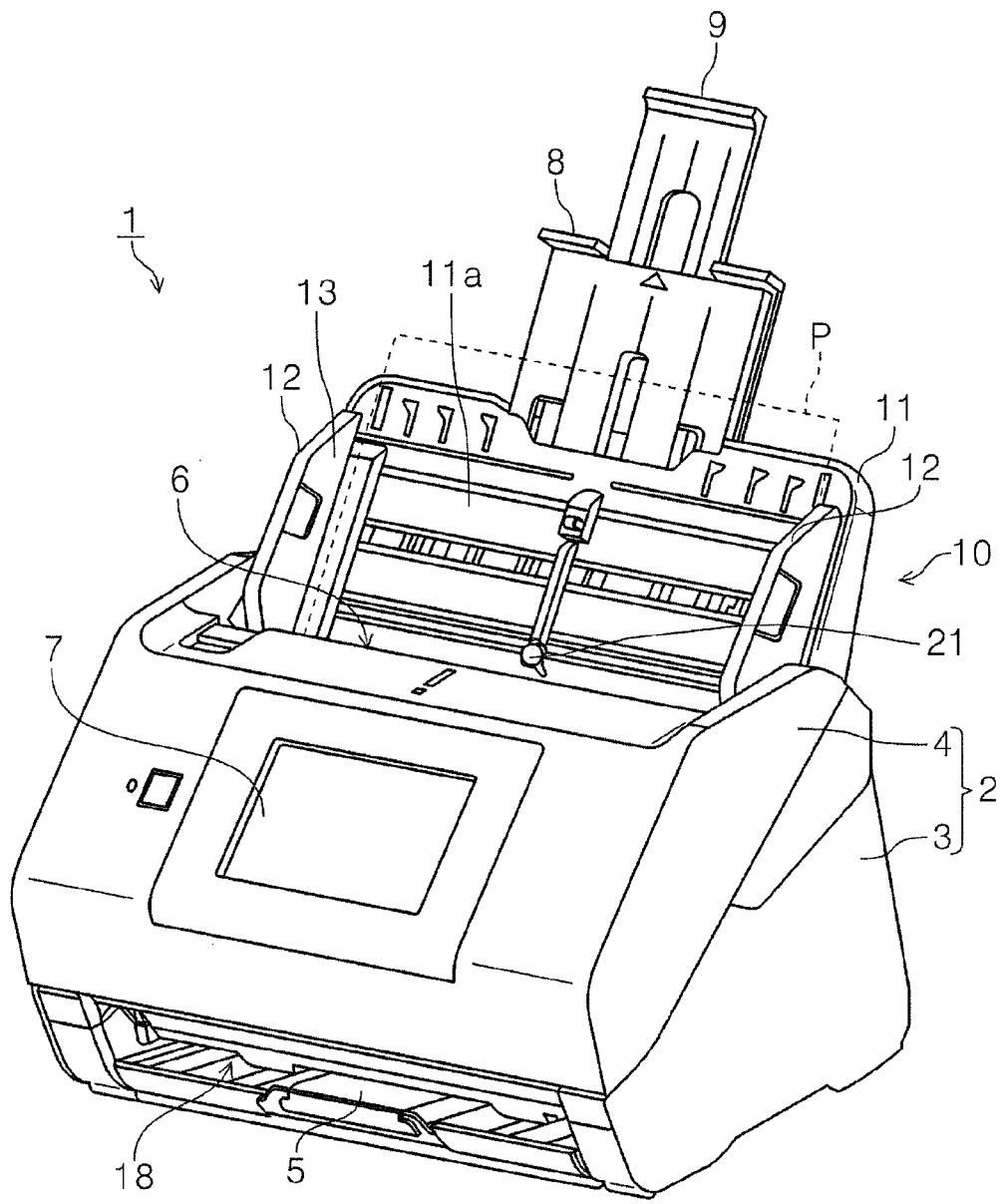
FIG. 1 is an exterior perspective view illustrating a scanner according to the invention.
Figure 2:
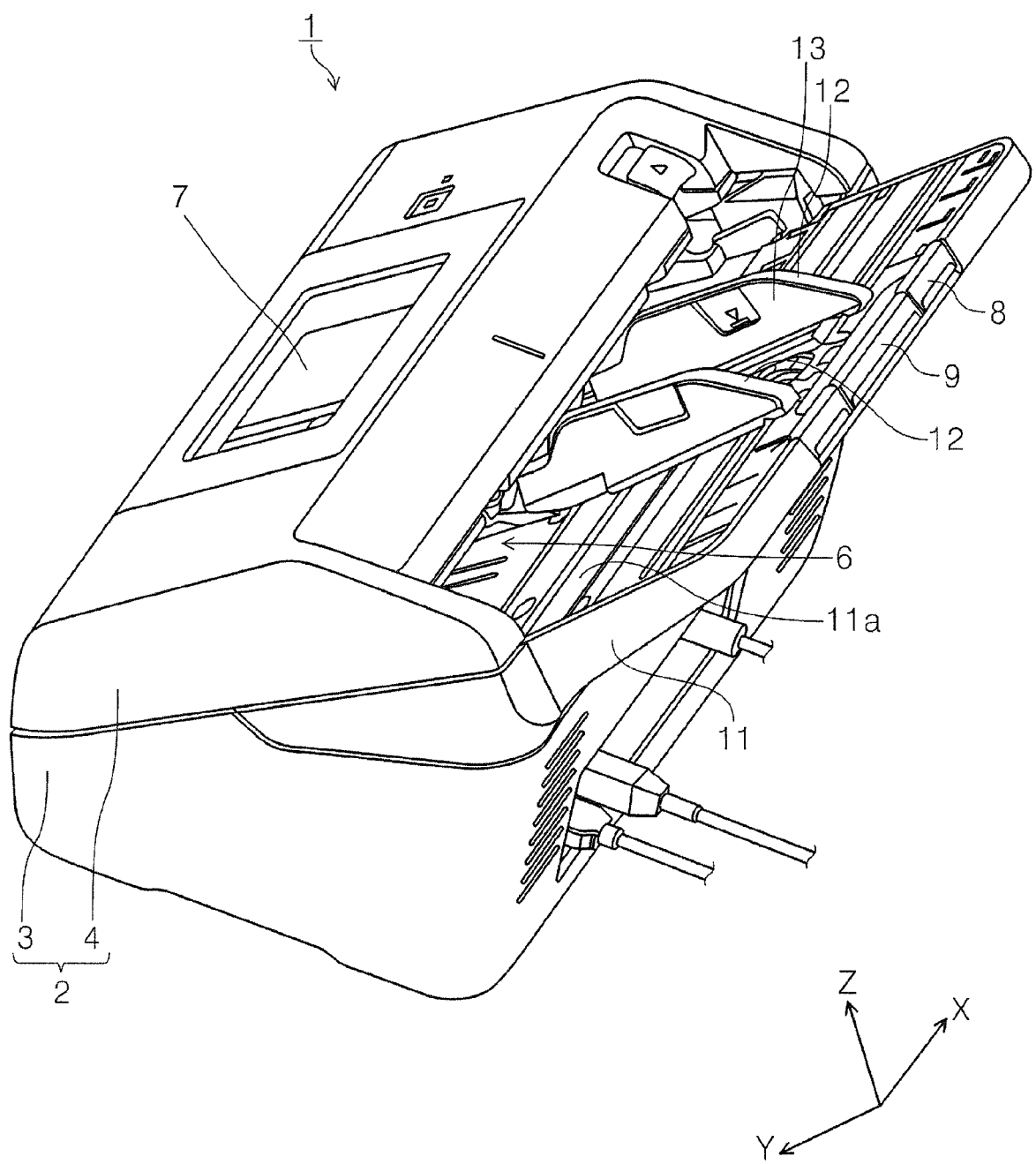
FIG. 2 is a perspective view illustrating the scanner according to the invention when seen at a different angle from FIG. 1.
Figure 3:
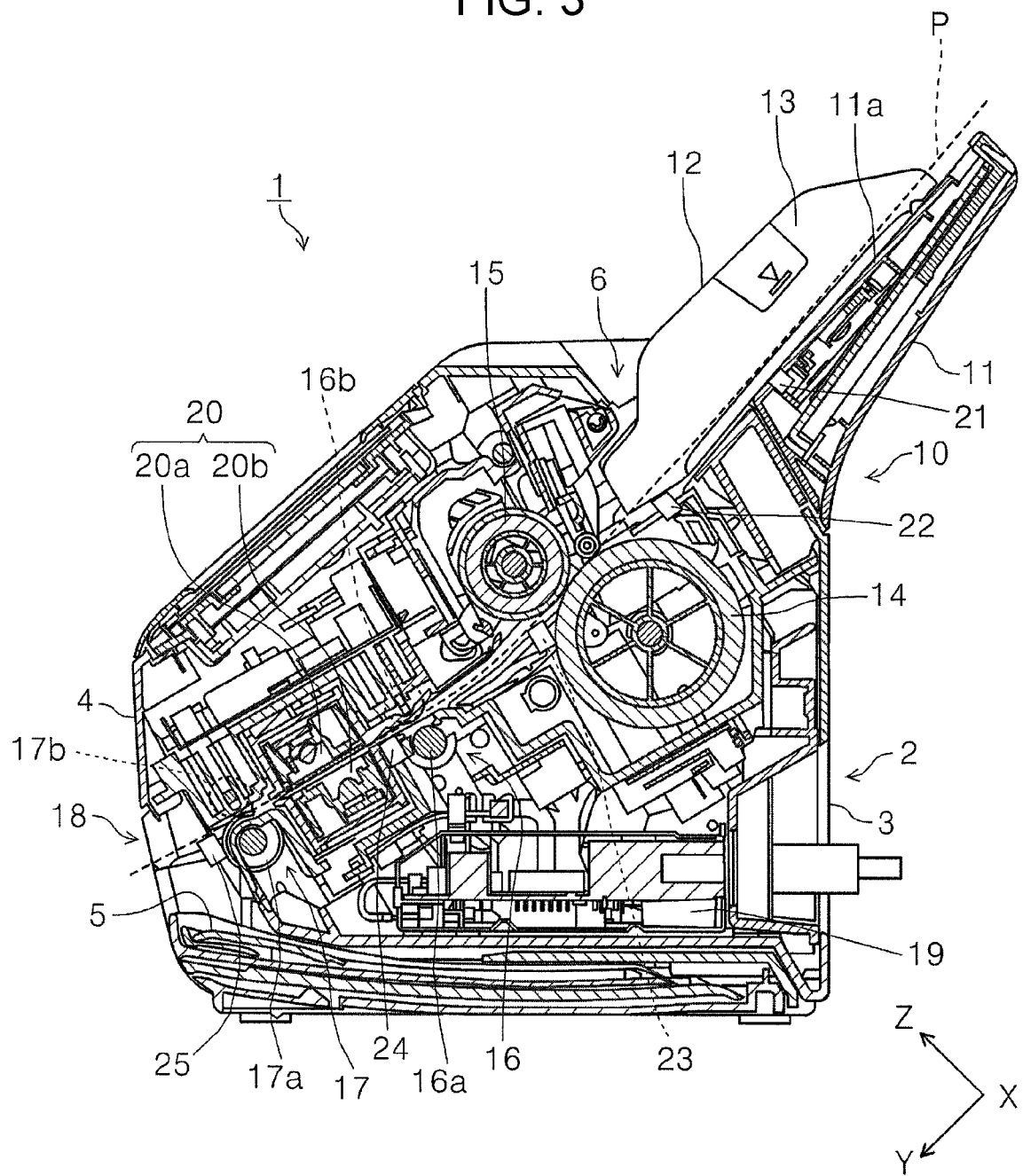
FIG. 3 is a side sectional view illustrating a paper transporting path in the scanner according to the invention.
Figure 4:
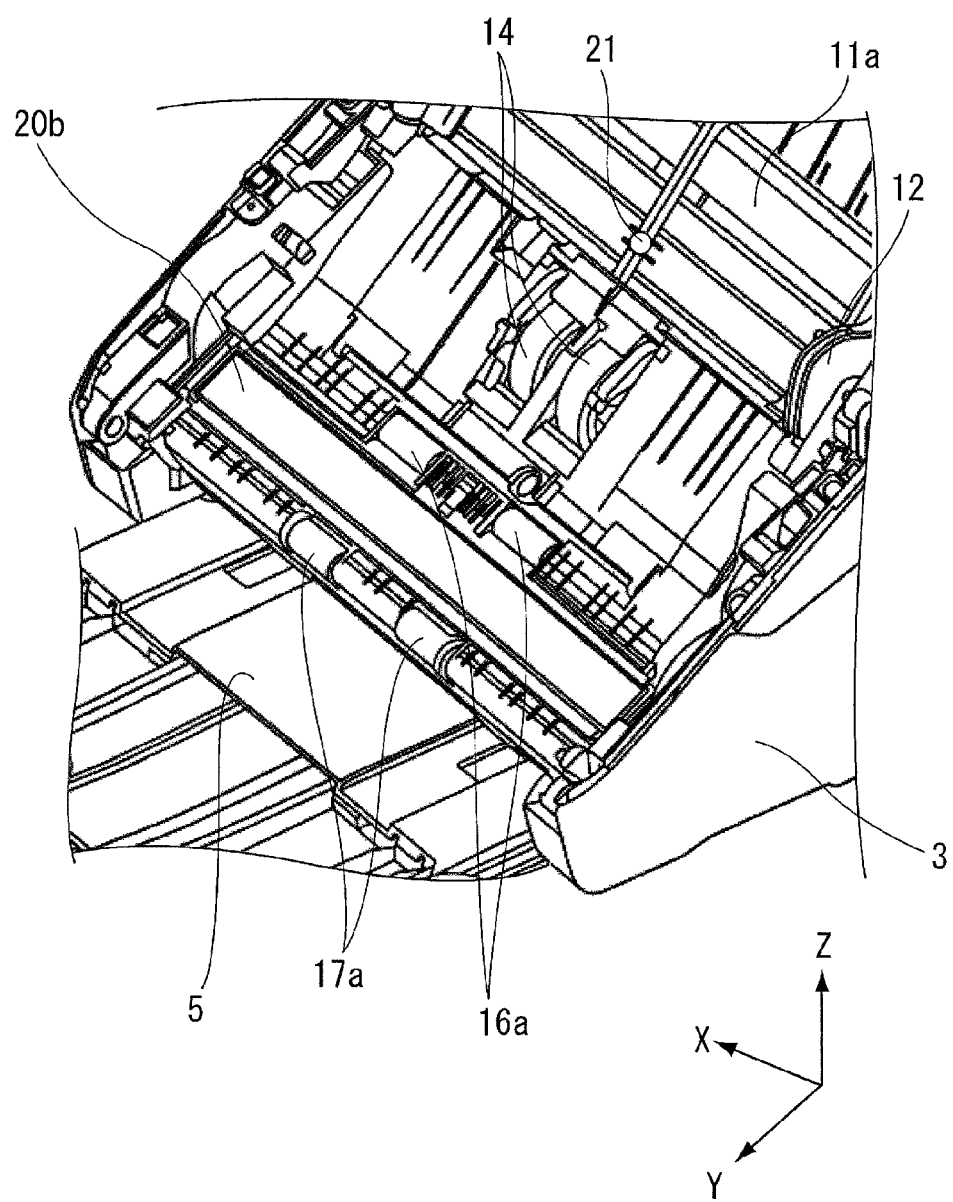
FIG. 4 is a perspective view illustrating a state in which an upper portion is removed from a lower portion.
Figure 5:
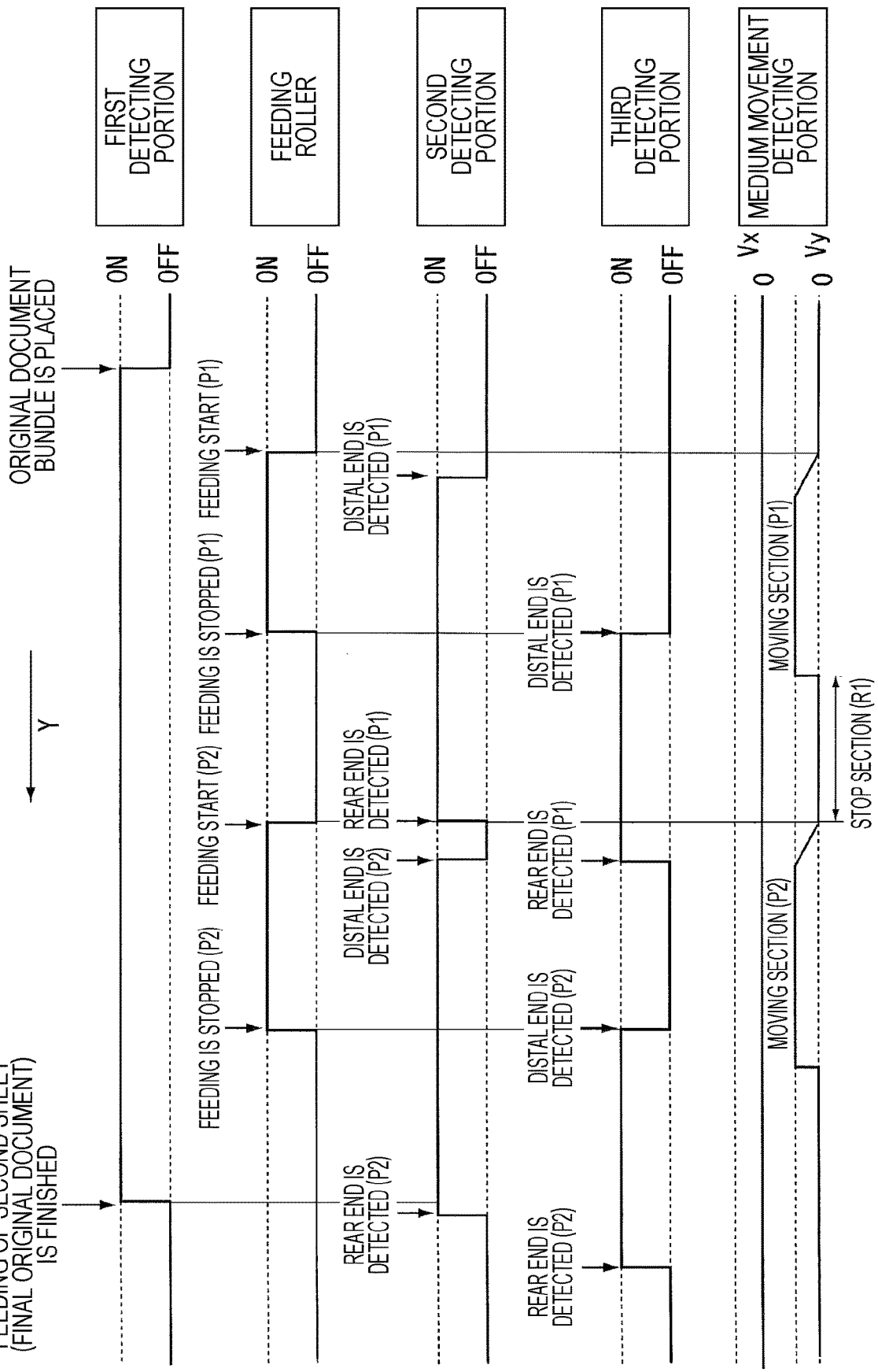
FIG. 5 is a diagram describing normal feeding of paper.
Figure 6:
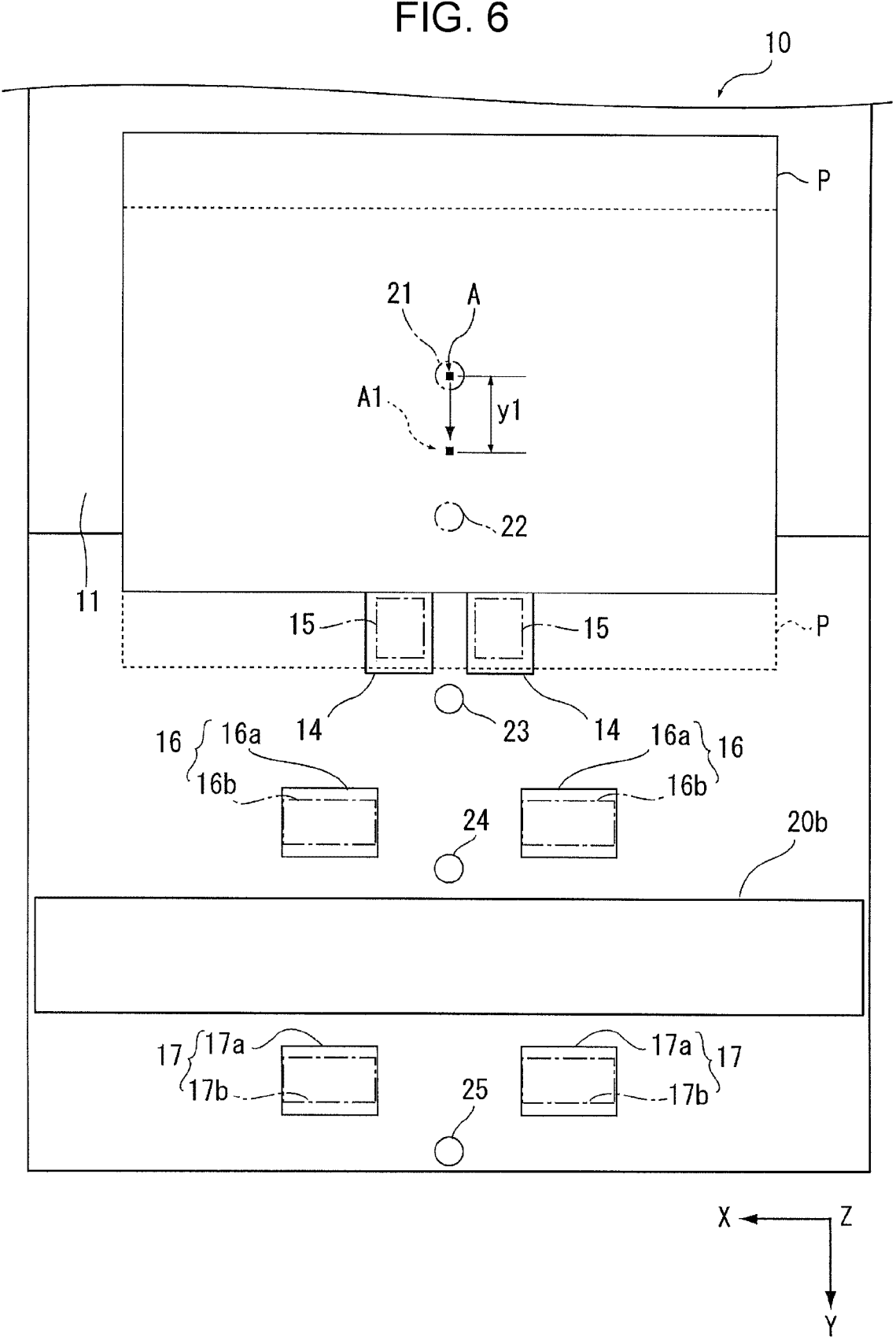
FIG. 6 is a schematic plan view illustrating a normal feeding state of the paper.
Figure 7:
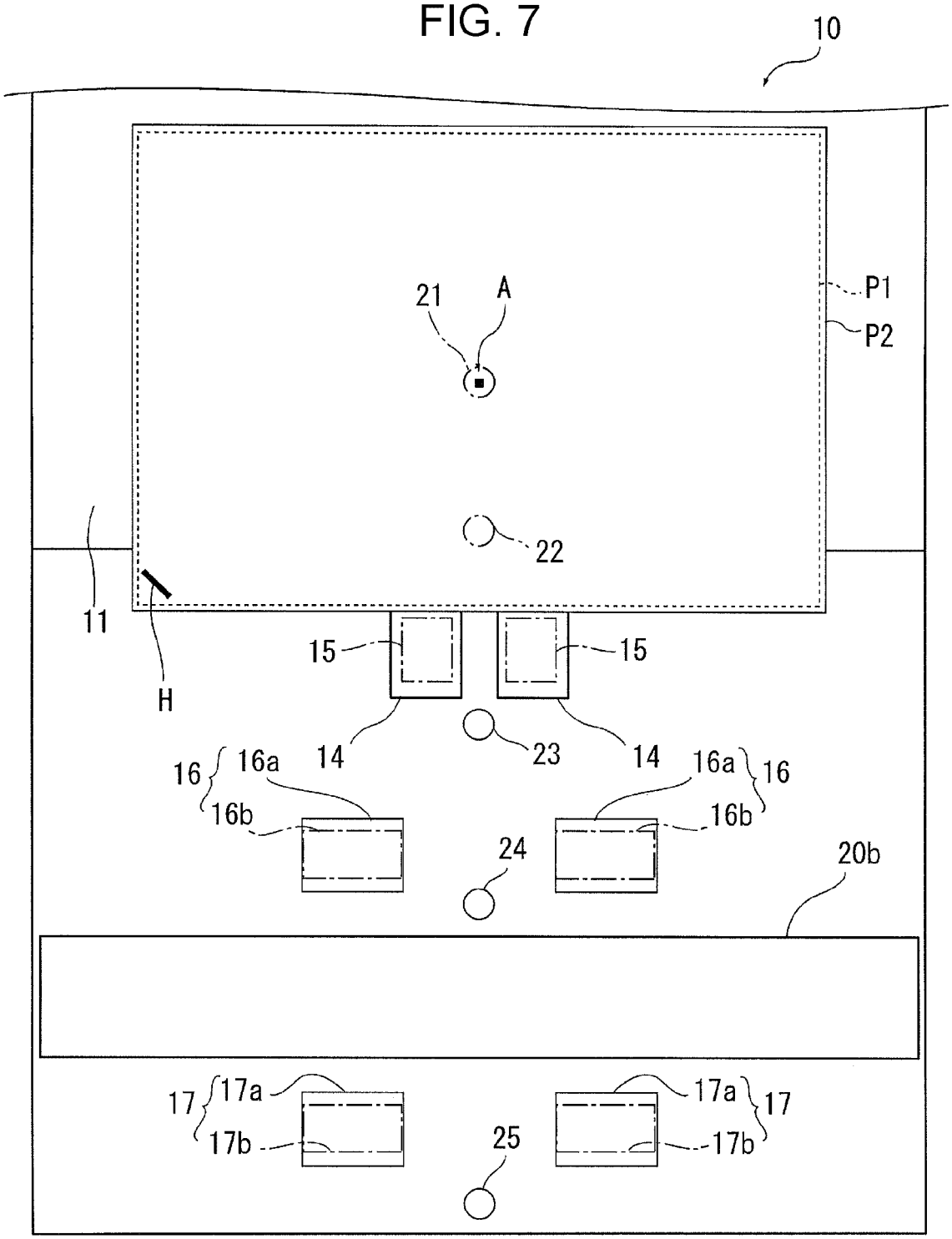
FIG. 7 is a schematic plan view illustrating a state in which stapled paper is placed on a medium placing portion with a clipped part thereof on a downstream side.
Figure 8:
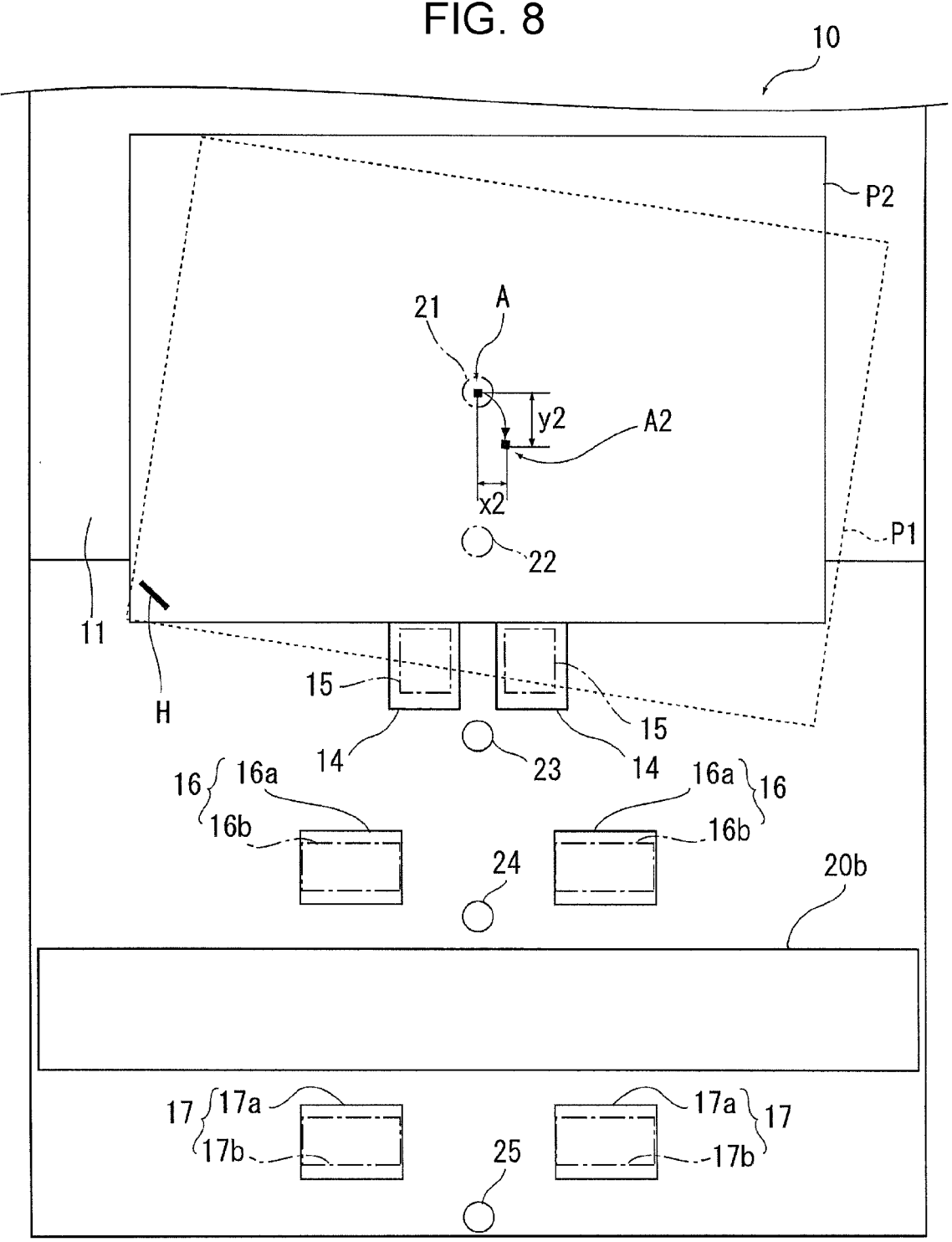
FIG. 8 is a schematic plan view illustrating an aspect in which the stapled paper is fed.

FIG. 1 is an exterior perspective view illustrating a scanner according to the invention. FIG. 2 is a perspective view illustrating the scanner according to the invention seen at a different angle from FIG. 1. FIG. 3 is a side sectional view illustrating a paper transporting path in the scanner according to the invention. FIG. 4 is a perspective view illustrating a state in which an upper portion is removed from the lower portion. FIG. 5 is a diagram describing normal feeding of paper. FIG. 6 is a schematic plan view illustrating a normal feeding state of paper. FIG. 7 is a schematic plan view illustrating a state in which stapled paper is placed on a medium placing portion with a clipped part thereof on a downstream side. FIG. 8 is a schematic plan view illustrating an aspect in which the stapled paper is fed.

Figure 9:
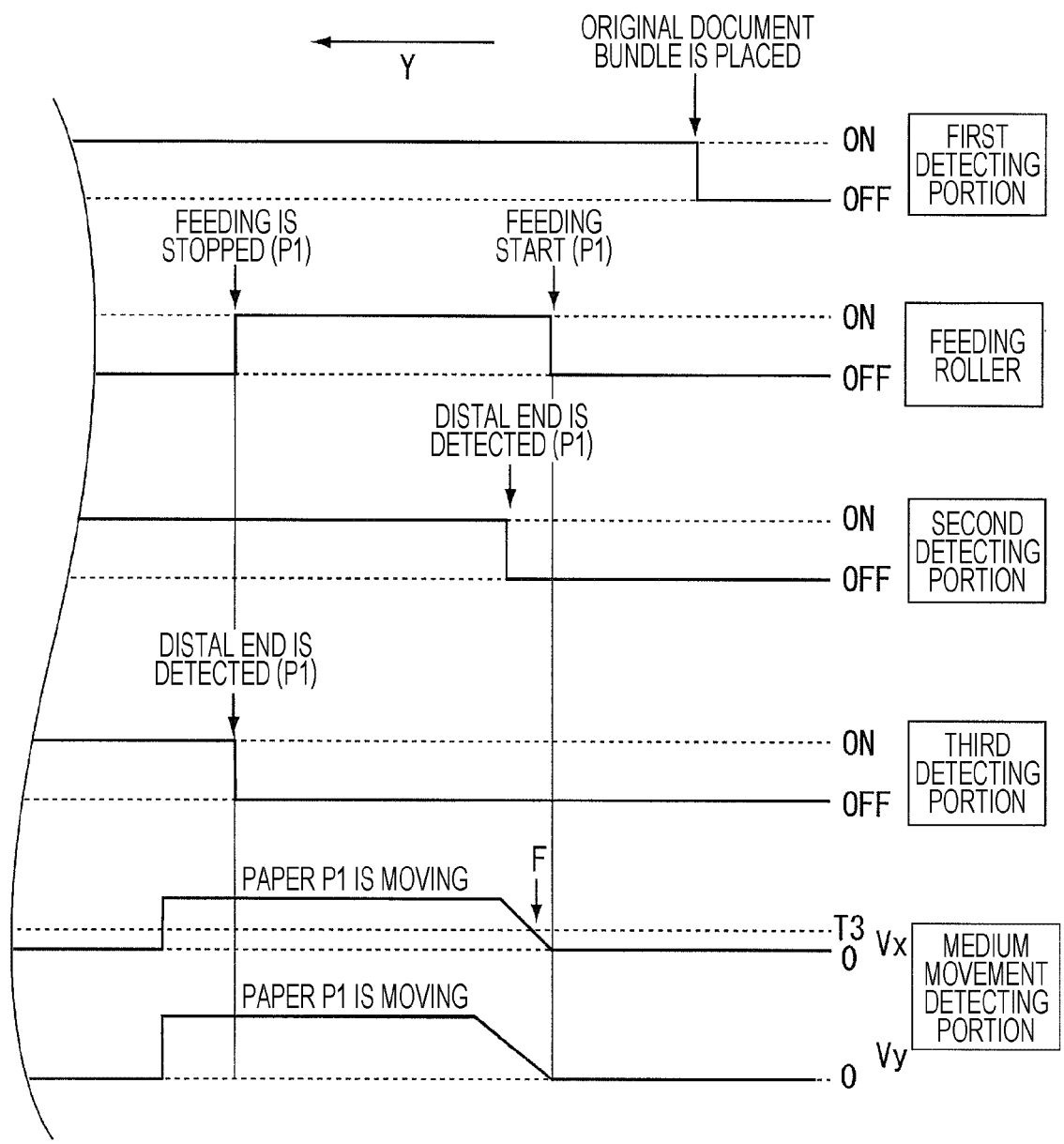
FIG. 9 is a diagram describing feeding of the stapled paper.

FIG. 9 is a diagram describing feeding of the stapled paper.

Figure 11:
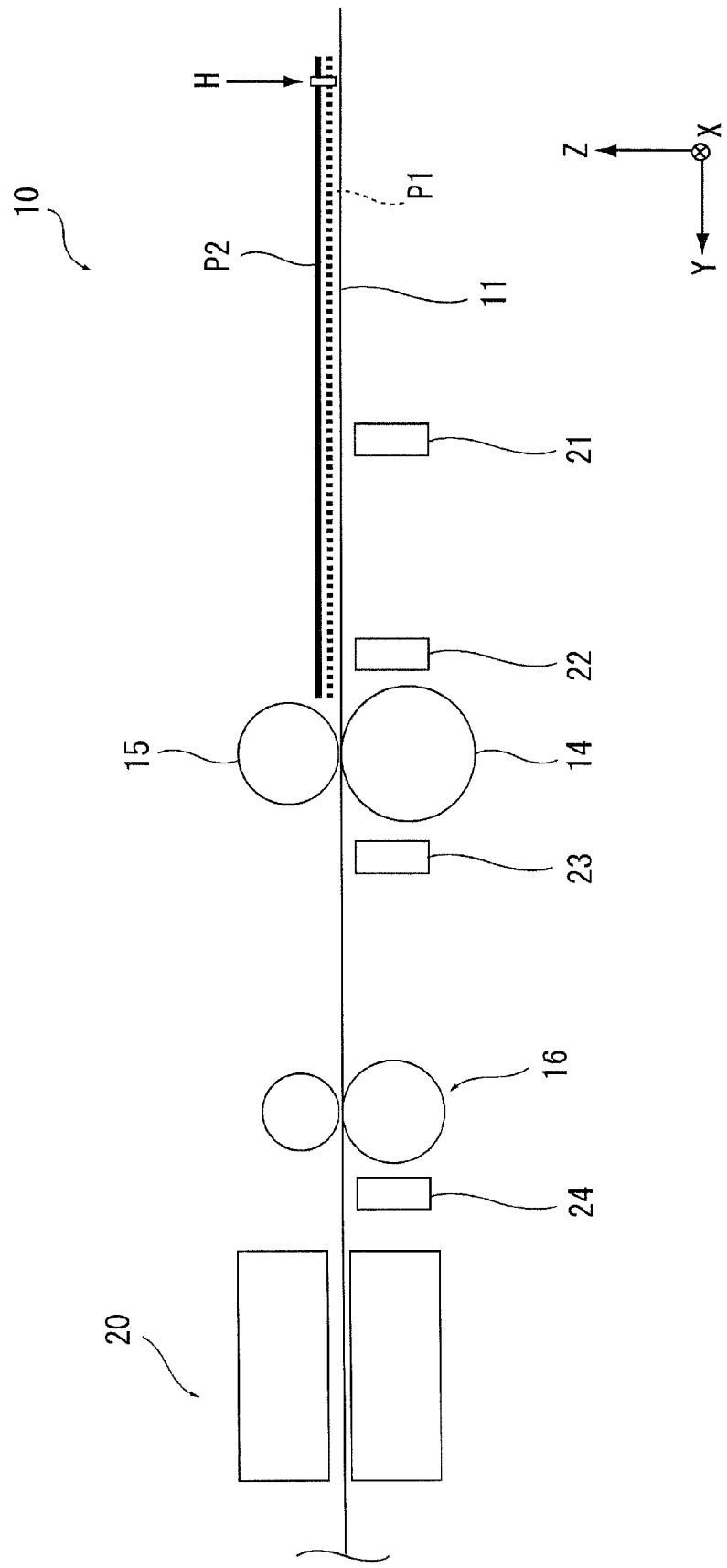
FIG. 11 is a schematic side view illustrating a state in which a state in which the stapled paper is placed on the medium placing portion with the clipped part thereof on the upstream.
Figure 12:
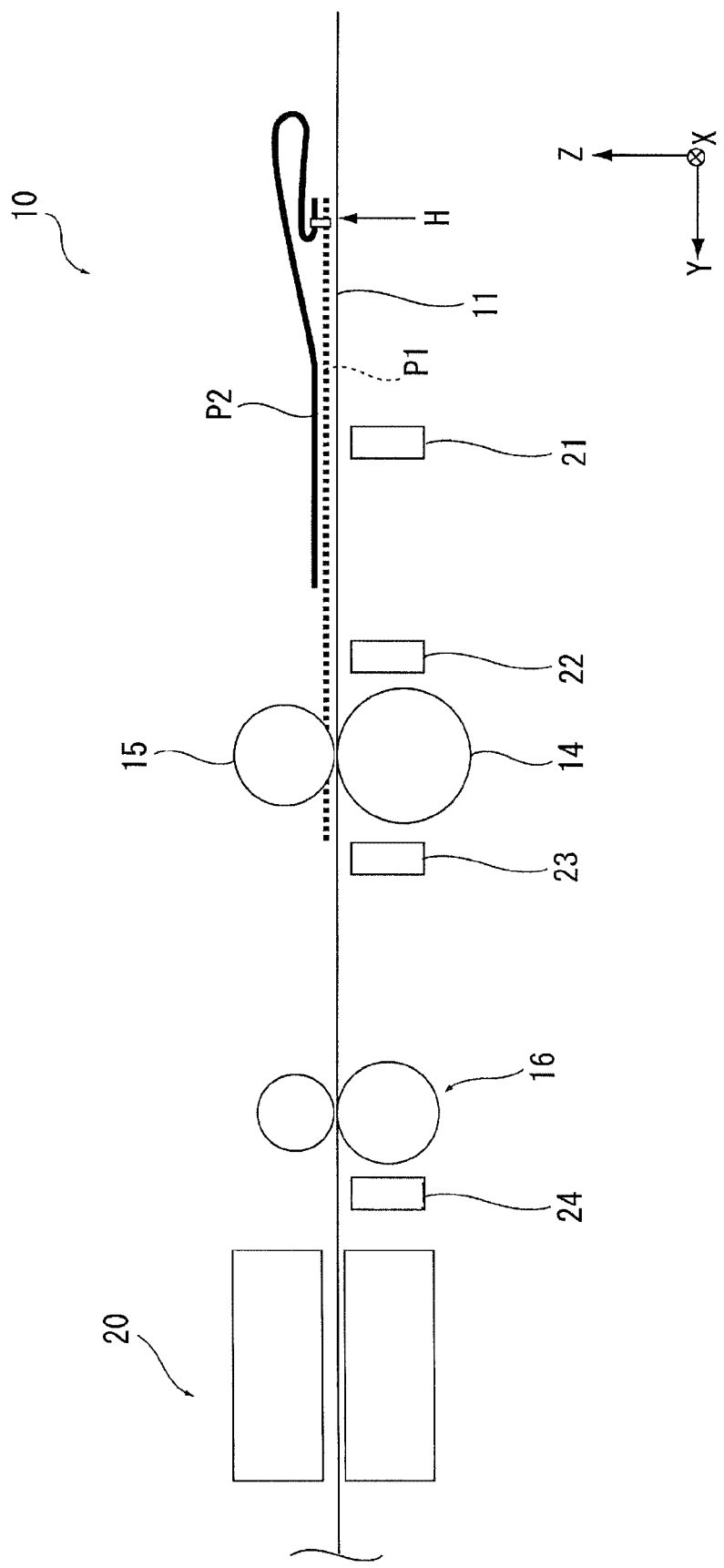
FIG. 12 is a schematic side view illustrating an aspect in which the stapled paper is fed.
Figure 13:
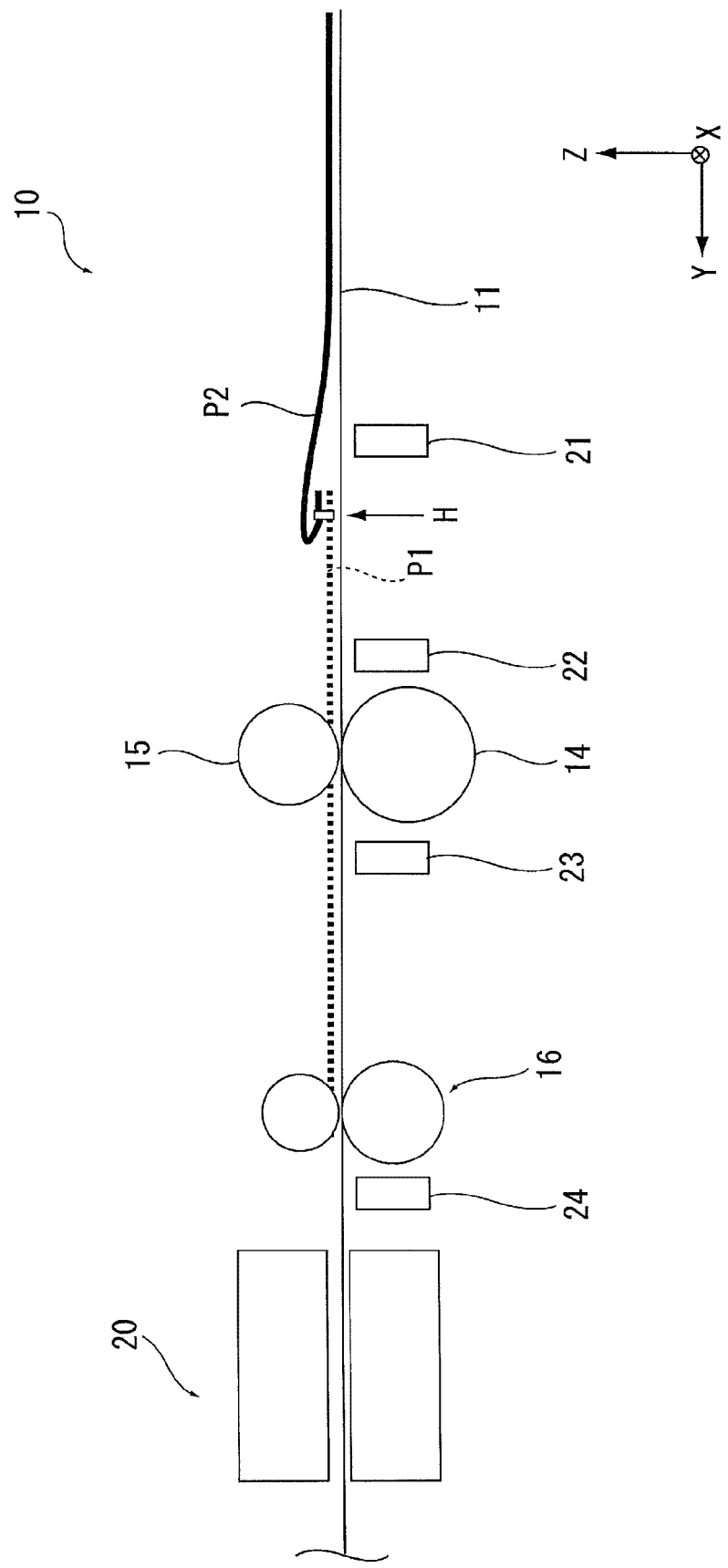
FIG. 13 is a schematic side view illustrating the aspect in which the stapled paper is fed.
Figure 14:
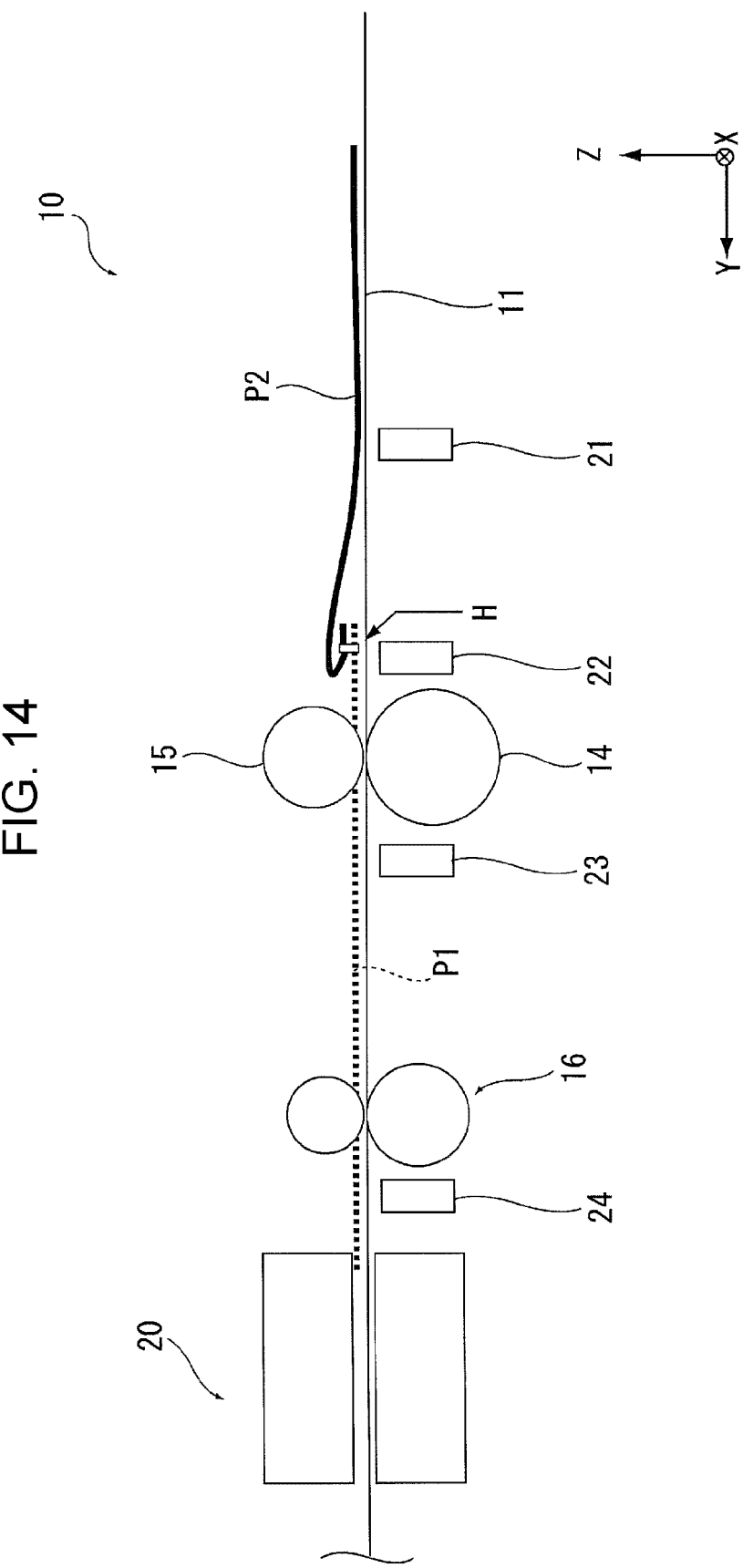
FIG. 14 is a schematic side view illustrating the aspect in which the stapled paper is fed.
Figure 15:
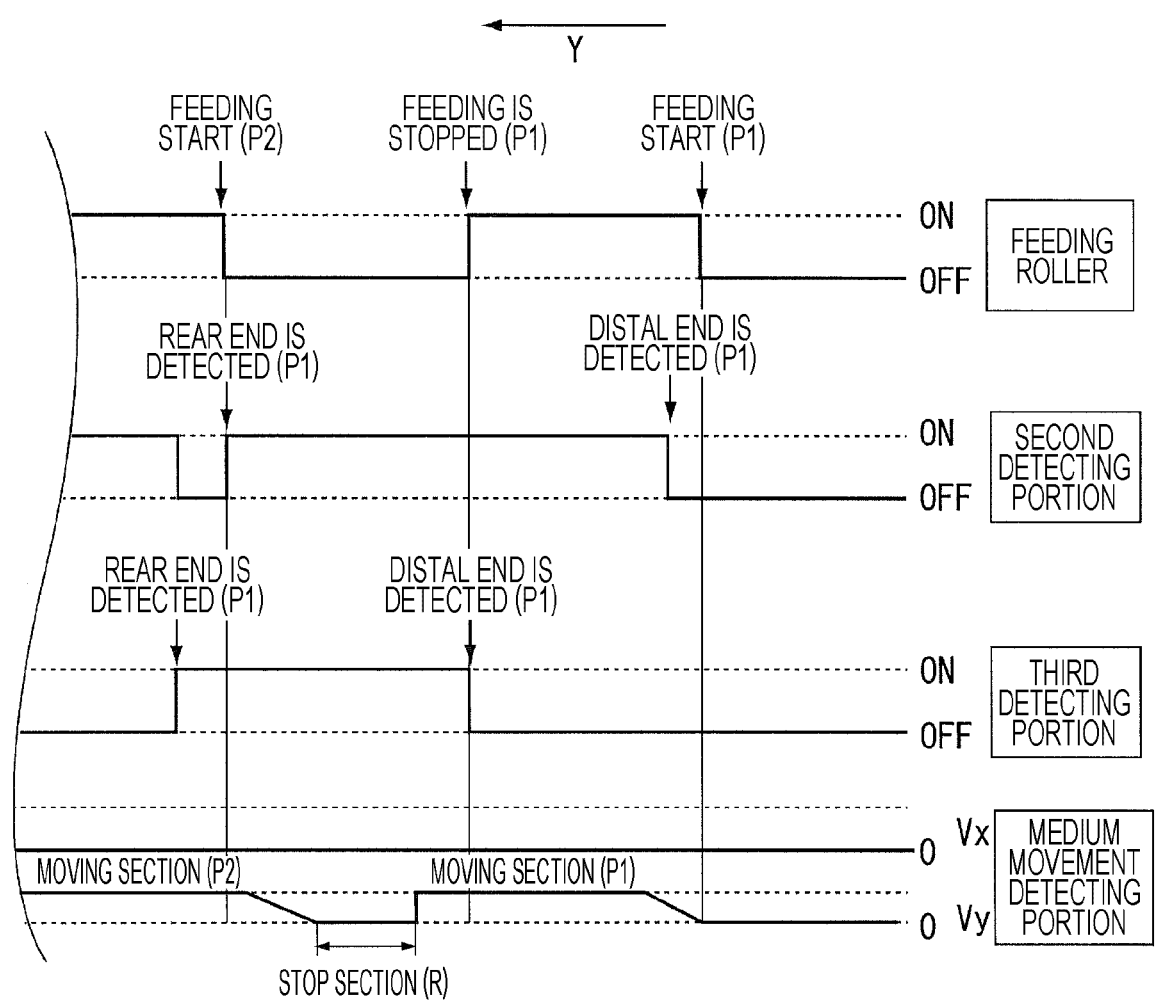
FIG. 15 is a diagram describing the feeding of the stapled paper.

FIG. 10 is a schematic plan view illustrating a state in which the stapled paper is placed on the medium placing portion with the clipped part thereof on an upstream side. FIG. 11 is a schematic side view illustrating a state in which a state in which the stapled paper is placed on the medium placing portion with the clipped part thereof on the upstream. FIG. 12 is a schematic side view illustrating an aspect in which the stapled paper is fed. FIG. 13 is a schematic side view illustrating the aspect in which the stapled paper is fed. FIG. 14 is a schematic side view illustrating the aspect in which the stapled paper is fed. FIG. 15 is a diagram describing the feeding of the stapled paper.

Figure 16:
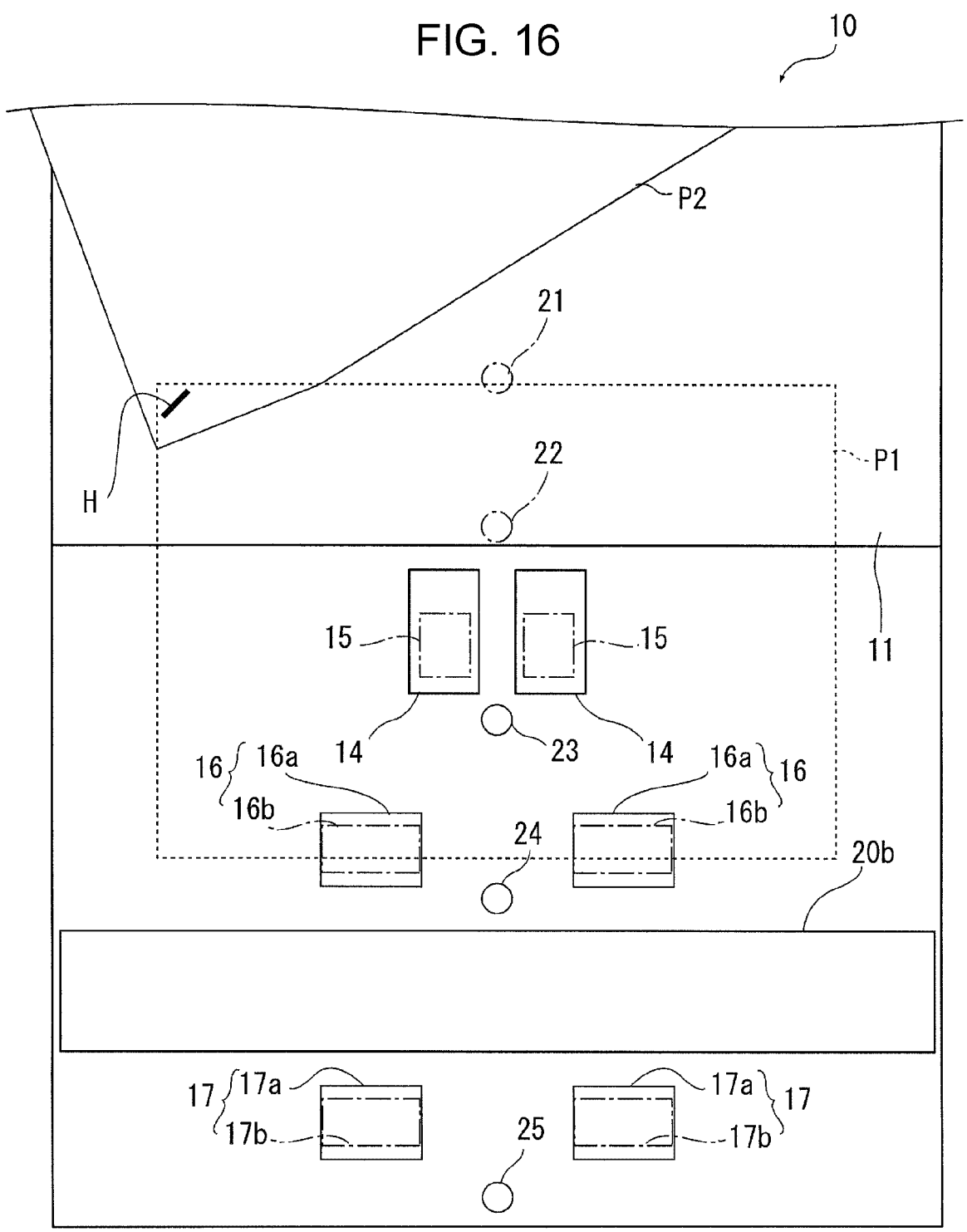
FIG. 16 is a schematic plan view of FIG. 13.
Figure 18:
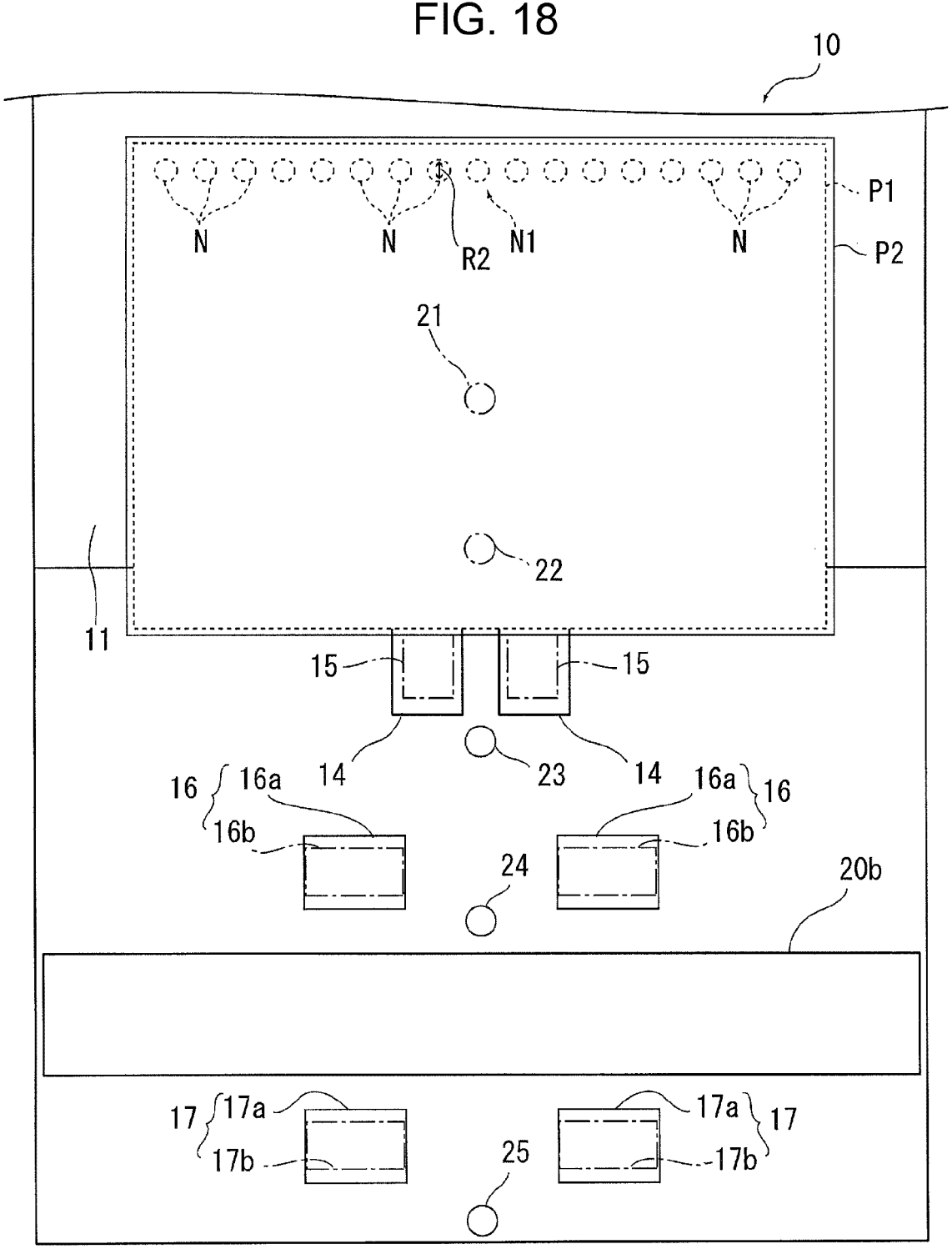
FIG. 18 is a schematic side view illustrating a state in which the paper having a punch hole is placed on the medium placing portion.
Figure 19:
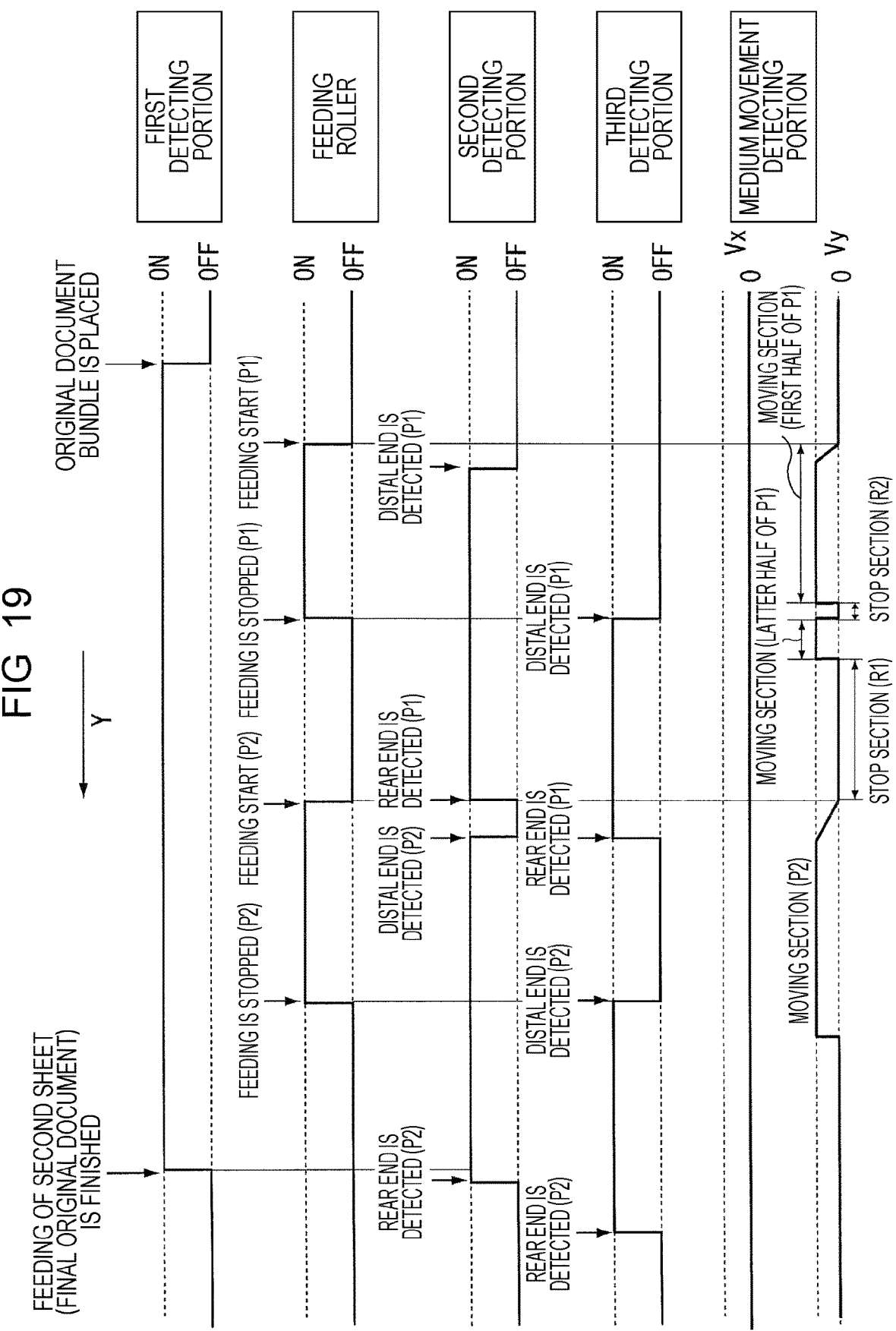
FIG. 19 is a diagram describing the feeding of the paper having the punch hole.

FIG. 16 is a schematic plan view of FIG. 13. FIG. 17 is a schematic plan view of FIG. 14. FIG. 18 is a schematic side view illustrating a state in which the paper having a punch hole is placed on the medium placing portion. FIG. 19 is a diagram describing the feeding of the paper having the punch hole.

Regarding an X-Y-Z coordinate system illustrated in each drawing, an X direction indicates a paper width direction which is a width direction of the apparatus, and a Y direction indicates a paper transporting direction. A Z direction indicates a direction intersecting the Y direction and substantially orthogonal to a surface of paper which is generally transported. In addition, a +Y direction side is set to a front surface side of the apparatus, and a −Y direction side is set to a rear surface side of the apparatus. In addition, a left side seen from the front surface side of the apparatus is set to a +X direction, and a right side is set to a −X direction. In addition, a +Z direction is set to an upper side (including upper portion, upper surface, and the like) of the apparatus, and a −Z direction side is set to a lower side (including lower portion, lower surface, and the like) of the apparatus. In addition, a direction (+Y direction side) where paper P is fed is set to a "downstream", and an opposite direction thereof (−Y direction side) is set to an "upstream".

Outline of Scanner

Hereinafter, a scanner 1 according to the invention will be described mainly with reference to FIGS. 1 and 2.

The scanner 1 illustrated in FIGS. 1 and 2 includes an apparatus main body 2 in which a reading unit 20 (FIG. 3) reading an image of paper P (medium) is included.

The apparatus main body 2 is configured with a lower portion 3 and an upper portion 4. The upper portion 4 is attached to be openable and closable with respect to a downstream side of the lower portion 3 in a paper transporting direction as a rotation fulcrum, the upper portion 4 opens by being rotated to the front surface side of the apparatus, and a paper jam process of the paper P is easily performed by exposing a paper document transporting path of the paper P.

A medium feeding device 10 which feeds the paper P toward the reading unit 20 is provided in the apparatus main body 2.

A medium placing portion 11 on which the paper P is placed is provided on a rear surface side (−Y axis direction side) of the apparatus of the apparatus main body 2. The medium placing portion 11 is a configuration component constituting the medium feeding device 10 and is provided to be detachable from the apparatus main body 2. A reference number 11a is a placing surface 11a of the paper P. Also, a detail configuration of the medium feeding device 10 will be described later.

In addition, a pair of right and left edge guides 12 and 12 including a guide surface 13 which guides a side edge of the paper P in a width direction (X axis direction) intersecting a feeding direction (Y axis direction) of the paper is provided on the medium placing portion 11.

The edge guides 12 and 12 are provided to be slidably movable in the X axis direction in accordance with a size of the paper P. In the embodiment, the edge guides 12 and 12 are configured to follow an X movement of one edge guide 12 (for example, +X side) by a known rack-pinion mechanism and to move in a direction opposite to the other edge guide 12 (−X side).

That is, in the medium placing portion 11, it is configured that the paper P is provided at the center in the width direction, a feeding roller 14 to be described later is provided at a center region in the width direction, and thus the paper is fed in a so-called center paper feeding method. FIG. 1 illustrates a state in which the edge guides 12 and 12 are positioned on the outermost side, and FIG. 2 illustrates a state in which the edge guides 12 and 12 are positioned on the innermost side.

The medium placing portion 11 includes a first auxiliary paper support 8 and a second auxiliary paper support 9. The first auxiliary paper support 8 and the second auxiliary paper support 9 can be accommodated in the medium placing portion 11 as illustrated in FIG. 2, and can be pulled out from the medium placing portion 11 as illustrated in FIG. 1, such that a length of the placing surface 11a can be adjusted.

The apparatus main body 2 includes an operation panel 7 for displaying various operations of setting reading or performing reading, contents of reading setting, and the like, on a front surface side of the apparatus of the upper portion 4.

A feeding port 6 connected to an inside of the apparatus main body 2 is provided on the upper portion 4, and the paper P placed on the medium placing portion 11 is fed toward the reading unit 20 provided inside the apparatus main body 2 from the feeding port 6.

In addition, a paper discharging tray 5 to be described later is provided on a front surface side of the apparatus of the lower portion 3.

Regarding Paper Transporting Path in Scanner

Next, a paper transporting path in the scanner 1 will be described mainly with reference to FIG. 3. Also, a dotted line in FIG. 3 indicates a transporting path of the paper P.

In the scanner 1, the paper P which is an original document is fed toward the reading unit 20 by the medium feeding device 10.

In the embodiment, the medium feeding device 10 as illustrated in FIG. 3 includes the medium placing portion 11 described above, the feeding roller 14 feeding the paper P placed on the medium placing portion 11 toward the reading unit 20, a medium movement detecting portion 21 (also refer to FIG. 1) positioned inside a placing region of the paper by the medium placing portion 11 on an upstream side of the feeding roller 14 in a medium feeding direction (+Y direction), and a controller 19 which controls operations of the medium feeding device 10. In addition, a pair of transporting rollers 16 is provided on the downstream side of the feeding roller 14.

The invention includes a characteristic of a control of the operations of the medium feeding device 10 by the controller 19 based on detected information by the medium movement detecting portion 21.

The medium movement detecting portion 21 and the control by the controller 19 based on the detected information by the medium movement detecting portion 21 will be described in detail after the paper transporting path is described.

In the medium feeding device 10, a separating roller 15, which nips the paper P between the feeding roller 14 and the separating roller and separates the paper, is provided at a position facing the feeding roller 14 provided on a downstream side of the medium placing portion 11.

As illustrated in FIG. 4, the feeding roller 14 and the separating roller 15 are provided in a center region in a medium width direction (X axis direction) intersecting a medium transporting direction (+Y direction).

Return to FIG. 3, the paper P placed on the medium placing portion 11 is nipped by the feeding roller 14 which is rotatably provided with respect to the lower portion 3 and is fed toward a downstream side (+Y direction side). Specifically, when the feeding roller 14 comes into contact with a surface of the paper P facing the medium placing portion 11 and is rotated, the paper P is fed toward the downstream side. Therefore, in a case in which a plurality of sheets of paper P is set in the medium placing portion 11 in the scanner 1, the plurality of sheets of the paper is fed in order from the paper P on a placing surface 11a side toward the downstream side.

The pair of transporting rollers 16, the reading unit 20 reading the paper P described above, and a pair of discharging rollers 17 are provided on the downstream side of the feeding roller 14.

The pair of transporting rollers 16 is provided on an upstream side of the reading unit 20 and transports the paper P fed by the feeding roller 14 toward the reading unit 20. The pair of transporting rollers 16 is configured with a transportation driving roller 16a and a transportation driven roller 16b.

The pair of transporting rollers 16 is also provided in a center region in the medium width direction in the same manner as that of the feeding roller 14 (FIG. 4).

The reading unit 20 includes an upper portion reading sensor 20a provided on the upper portion 4 side and a lower portion reading sensor 20b provided on the lower portion 3 side. In the embodiment, the upper portion reading sensor 20a and the lower portion reading sensor 20b are constituted by a contact type image sensor module (CISM) as an example.

After at least one surface of a front surface and a rear surface of the paper P is read by the reading unit 20, the paper P is nipped by the pair of discharging rollers 17 positioned on the downstream side of the reading unit 20 and is discharged from a discharging port 18 provided on a front surface side of the apparatus of the lower portion 3. The pair of discharging rollers 17 is configured with a discharge driving roller 17a and a discharge driven roller 17b.

Also, the feeding roller 14, the transportation driving roller 16a, and the discharge driving roller 17a in the embodiment are rotary-driven by at least one driving source (not illustrated) provided inside the lower portion 3. In addition, the driving source (not illustrated) is controlled by the controller 19, and therefore, driving of the feeding roller 14, the transportation driving roller 16a, and the discharge driving roller 17a are controlled. That is, the controller 19 controls a feeding operation of the paper P.

The paper discharging tray 5 which can be pulled out from the discharging port 18 toward the front surface side of the apparatus is provided in the lower portion 3. The paper discharging tray 5 takes a state of being accommodated on a bottom portion of the lower portion 3 (FIG. 1) and a state of being pulled to the front surface side of the apparatus which is not illustrated. In a state in which the paper discharging tray 5 is pulled out, the paper P discharged from the discharging port 18 can be loaded on the paper discharging tray 5.

Also, as illustrated in FIG. 3, a first detecting portion 22 detecting presence or absence of the paper P being placed on the medium placing portion 11 is provided on a downstream side of the medium movement detecting portion 21 in the medium feeding direction and inside a placing region of the paper by the medium placing portion 11 on the upstream side of the feeding roller 14. In addition, a second detecting portion 23, a third detecting portion 24, and a fourth detecting portion 25 are sequentially provided on the downstream side of the feeding roller 14, a downstream side of the pair of transporting rollers 16, and a downstream side of the pair of discharging rollers 17. A position of the paper P in the medium feeding direction can be detected by the second detecting portion 23 and the third detecting portion 24.

The first detecting portion 22, the second detecting portion 23, the third detecting portion 24, and the fourth detecting portion 25 are provided in a center region in the width direction.

As the first detecting portion 22, the second detecting portion 23, the third detecting portion 24, and the fourth detecting portion 25, a light sensor including a light emitting portion (illustration is omitted) emitting light and a light receiving portion (illustration is omitted) receiving reflected light of the light emitted from the light emitting portion can be used. In addition, instead of the light sensor, an ultrasonic type sensor including a transmitter emitting ultrasonic waves and a receiver provided to face the transmitter with paper to be transported between the transmitter and the receiver can also be used. In addition, a lever type sensor, which detects displacement of a mechanical lever being moved due to a contact of the paper to be transported in an optical type or an electric contact type manner, can also be used.

Regarding Operation of Feeding Roller

In a case in which an original document (paper P) is set on the medium placing portion 11 and is read, the controller 19 controls the driving of the feeding roller 14 based on detected information of the paper by the first detecting portion 22, the second detecting portion 23, and the third detecting portion 24 as illustrated in FIG. 3.

With reference to FIG. 5, a basic operation of the feeding roller 14 in a case in which two or more sheets of the original document (paper P) are set on the medium placing portion 11 and are read will be described.

Also, in FIG. 5, ON of the first detecting portion 22, the second detecting portion 23, and the third detecting portion 24 indicates a detected state of the paper, and OFF indicates a non-detected state. In the feeding roller 14, ON indicates a driving state, and OFF indicates a stop state.

When an original document bundle is set on the medium placing portion 11, the first detecting portion 22 detects the paper so as to be an ON state (the first detecting portion is turned on=the original document bundle is placed). When the first detecting portion 22 is set to the ON state, if the original document is started to be read, the feeding roller 14 starts to be driven, and a first sheet of the paper P1 from the bottom is fed (the feeding roller starts to feed the paper (P1)).

When the feeding roller 14 feeds the first sheet of the paper P1, the second detecting portion 23 on an immediate downstream side of the feeding roller 14 detects a distal end of the paper P1 (the second detecting portion is turned on=a distal end is detected (P1)). When the feeding roller 14 further feeds the paper P1, and the third detecting portion 24 on an immediate downstream side of the pair of transporting rollers 16 detects the distal end of the paper P1 (the third detecting portion is turned on=the distal end is detected (P1)), the driving of the feeding roller 14 is stopped (the feeding roller stops feeding of the paper (P1)), and the paper P1 is fed by the pair of transporting rollers 16.

Also, after the driving of the feeding roller 14 is stopped, a rear end side of the paper P1 is still nipped between the feeding roller 14 and the separating roller 15. In order to suppress nipping of the paper P1 between the feeding roller 14 and the separating roller 15 which becomes a transportation load, the feeding roller 14 and the separating roller 15 which are stopped to be driven are configured to be idly rotated in a transporting direction of the paper P1.

In addition, a case in which the third detecting portion 24 is turned off indicates that a rear end of the first sheet of the paper P1 passes through the pair of transporting rollers 16 (the third detecting portion is turned off=the distal end is detected (P1)). At this time, the first sheet of the paper is fed by the pair of discharging rollers 17.

The feeding roller 14 is stopped until a rear end of the paper P1 passes through the feeding roller 14 and is driven again after the rear end of the paper P1 passes, and a second sheet of paper P2 is started to be fed. That is, when the second detecting portion 23 detects the rear end of the paper P1 (the second detecting portion is turned off=the rear end is detected (P1)), the feeding roller 14 starts to feed a second sheet of the paper P2 (the feeding roller starts to feed (P2)).

Also, a distal end of the paper P2 is detected by the second detecting portion 23 (the second detecting portion is turned on=the distal end is detected (P2)). When the feeding roller 14 further feeds the paper P2, and the third detecting portion 24 on the immediate downstream side of the pair of transporting rollers 16 detects the distal end of the paper P2 (the third detecting portion is turned on=the distal end is detected (P2)), the driving of the feeding roller 14 is stopped (the feeding roller stops feeding (P2)), and the pair of transporting rollers 16 feeds the paper P2.

Here, before the second detecting portion 23 detects a rear end of the second sheet of the paper (the second detecting portion is turned off=the rear end is detected (P2)), in a case in which the first detecting portion 22 does not detect the paper (the first detecting portion is turned off), a final original document (second sheet in the invention) is finished to be fed.

Therefore, in a case in which the second detecting portion 23 detects the rear end of the second sheet of the paper after the first detecting portion 22 is turned off (the second detecting portion is turned off=the rear end is detected (P2)), the feeding roller 14 is not re-driven.

When the pair of transporting rollers 16 feeds the paper P2, the third detecting portion 24 is turned off, and the rear end of the paper P2 is detected (the third detecting portion is turned off=the rear end is detected (P2)). The paper P2 is fed by the pair of discharging rollers 17, and reading of the paper P2 is completed.

Regarding Medium Movement Detecting Portion

Continuously, with reference to FIGS. 3 and 4, the medium movement detecting portion 21 will be described.

In the embodiment, as illustrated in FIGS. 3 and 4, the medium movement detecting portion 21 is positioned distant from the upstream side of the feeding roller 14 in the medium feeding direction, and is provided inside a placing region of the paper by the medium placing portion 11.

The feeding roller 14 is provided in the center region in the width direction, and one medium movement detecting portion 21 is provided in the center region in the width direction.

In the embodiment, the medium placing portion 11 of the medium feeding device 10 is capable of placing a plurality of types of paper having different sizes thereon. The medium movement detecting portion 21 is provided inside a placing region where paper having the minimum size (card size such as business card as an example) which can be fed by the medium feeding device 10.

The medium movement detecting portion 21 is configured to be detectable movement of the paper P being fed by the feeding roller 14 toward both the medium feeding direction (Y axis direction) and the width direction (X axis direction) intersecting the medium feeding direction.

Such a medium movement detecting portion 21 is, for example, a sensor based on a principle the same as or similar to that of a sensor which is capable of detecting two-dimensional (plane) movement being used in a mouse for a computer, and known sensors in various methods such as an optical type (red LED), a laser type, a ball type, a blue LED type, and an infrared ray type (IR) can be used. In the embodiment, the optical type (red LED) sensor is used.

However, a user may erroneously place an original document bundle bound by a stapler on the medium placing portion 11 of the medium feeding device 10. In a case in which only one corner of the original document bundle is bound, when a first sheet of the original document bundle is fed, a binding portion is pulled, and therefore, there is a concern that damage may be generated in a first sheet of the original document or sheets subsequent to a second sheet of the original document.

In the embodiment, such a transportation failure of the paper can be early detected by the medium movement detecting portion 21. Hereinafter, based on detected information of the medium movement detecting portion 21, a control of feeding of the paper P by the controller 19 will be described.

Regarding Control of Controller

The controller 19 in the medium feeding device 10 is capable of performing a "control 1" and a "control 2" for controlling feeding of the paper P based on the detected information of the medium movement detecting portion 21.

That is, the controller 19 receives the detected information by the medium movement detecting portion 21 and stops a job in a case in which a physical quantity relating to movement of the paper P in the width direction (X axis direction) exceeds a third threshold T3 as a predetermined threshold (control 1).

In addition, the controller 19 receives the detected information by the medium movement detecting portion 21 and stops the job, in a case in which a stop section, when a moving section, the stop section, and a moving section of the paper P in the medium movement detecting portion 21 in the medium feeding direction (Y axis direction) are sequentially detected, is shorter than a predetermined a first threshold R1 (control 2).

Hereinafter, the "control 1" and the "control 2" will be specifically described in sequence.

Regarding Control 1

The "control 1" is a control in which a transportation failure of the paper is detected based on the movement of the paper P in the width direction (X axis direction) detected by the medium movement detecting portion 21 and transportation of the paper is stopped the scanner 1.

First, detection by the medium movement detecting portion 21 in a case in which the paper is normally fed will be described with reference to FIGS. 5 and 6. In FIG. 6, the paper P before being fed which is set on the medium placing portion 11 is illustrated by a solid line, and the paper P which is fed by a predetermined feeding amount y1 by the feeding roller 14 is illustrated by a dotted line. When a position to be detected by the medium movement detecting portion 21 is set to a position A in the paper P before being fed (solid line), after the paper is fed by only the feeding amount y1, the position A is straightly moved to a position A1 in the +Y direction, but the position A is not moved in the X axis direction. That is, the paper P is not moved in the width direction (X axis direction). A distance from the position A to the position A1 is the feeding amount y1.

Here, based on a moving distance and a time being detected by the medium movement detecting portion 21, a speed of the paper P is obtained as the physical quantity relating to the movement of the paper. When a moving speed of the paper P in the Y axis direction is set to Vy, and a moving speed of the paper P in the X axis direction is set to Vx, changes of the moving speed Vy and the moving speed Vx in a case in which a plurality of sheets (two sheets) of the paper is fed by the feeding roller 14 so as to be fed toward the downstream side are illustrated in FIG. 5. In FIG. 5, the first sheet of the paper is set to P1, and the second sheet of the paper is set to P2.

As described above, since the paper is not moved in the width direction (X axis direction) at the time of being fed, the moving speed Vx is zero (0). Meanwhile, regarding movement in the Y axis direction, if the feeding roller 14 starts to feed the paper (the feeding roller starts to feed the paper (P1)), the first sheet of the paper from the bottom is started to be moved, and a predetermined speed is detected as the moving speed Vy. Also, in FIG. 5, a "moving section (P1)" is a section where the movement of the paper P1 is detected by the medium movement detecting portion 21.

When the first sheet of the rear end of the paper P1 is fed to the downstream side nearer than the medium movement detecting portion 21, the medium movement detecting portion 21 detects the second sheet of the paper (which is not fed so as to be stopped), and thus the moving speed Vy is zero (0). A section where the moving speed Vy being detected by the medium movement detecting portion 21 is zero is referred to as a "stop section".

When a rear end of the first sheet of the paper is detected by the second detecting portion (the second detecting portion is turned off=the rear end is detected (P1)), the feeding roller 14 starts to feed the second sheet of the paper P2 (the feeding roller starts to feed (P2)). Then, the medium movement detecting portion 21 detects a predetermined moving speed Vy again. When the rear end of the second sheet of the paper (final original document) is fed to the downstream side nearer than the medium movement detecting portion 21, the medium movement detecting portion 21 becomes a state in which the movement of the paper is not detected. A section where the medium movement detecting portion 21 detects the movement of the second sheet of the paper P2 is referred to as a "moving section (P2)".

Next, for example, as illustrated in FIG. 7, a state in which the original document bundle clipped by a stapler is placed on the medium placing portion 11 with a clipped part H thereof toward the downstream side is considered. In FIG. 7, the first sheet of the paper from the bottom is set to the paper P1 (illustrated by dotted line), and a next sheet (second sheet of paper) disposed on the first sheet is set to the paper P2 (illustrated by solid line). In the embodiment, a case in which two sheets of the paper are stapled is described, but a case in which three sheets or more of the paper are clipped by a stapler is also the same.

When the original document bundle is set in a state of FIG. 7, and the feeding roller 14 starts to feed the original document bundle, as illustrated in FIG. 8, since a clipped part H side (+X direction side) in the paper P1 is not moved so as to remain, and an opposite side (−X direction side) distant from the clipped part H side is fed by the feeding roller 14, the paper is rotary-moved in a clockwise direction based on a vicinity of the clipped part H in a case in which FIG. 8 is seen in a plan view.

That is, the paper P1 is moved so that the position A detected by the medium movement detecting portion 21 before being fed is moved to a position A2. The position A2 at this time is a position which is moved in not only the Y axis direction but also the X axis direction with respect to the position A. Also, the position A2 is moved by only a distance y2 in the +Y direction and a distance x2 in the −X direction from the position A.

When the paper P1 is moved from the state of FIG. 7 to a state of FIG. 8, the moving speed of the paper P1 obtained from paper detected information of the medium movement detecting portion 21 is illustrated in FIG. 9. In the normal feeding state illustrated in FIG. 5, with respect to that the moving speed Vx of the paper P in the X axis direction is zero, in FIG. 9, the paper P1 is moved while being rotated as illustrated in FIG. 8, and thus the moving speed Vx in the X axis direction also increases in accordance with an increase of the moving speed Vy in the Y axis direction.

Here, the controller 19 stops the job in a case in which the moving speed Vx as the physical quantity relating to the movement of the paper P1 in the width direction (X axis direction) obtained based on the detected information by the medium movement detecting portion 21 exceeds a third threshold T3 (FIG. 9) as a predetermined threshold. That is, in FIG. 9, at a timing illustrated by a reference number F, rollers (feeding roller 14, a pair of transporting rollers 16, and a pair of discharging rollers 17) relating to transportation of the paper are stopped to be driven. Thus, it is possible to early detect the movement of the paper P1 in the width direction lead to a transportation failure of the paper and to suppress damage to be generated in the paper P1.

Also, in a case in which a timing when the moving speed Vx exceeds the third threshold T3 is in the middle of the driving of the feeding roller 14 as illustrated in FIG. 9, at least the driving of the feeding roller 14 is stopped, and thereby making it possible to stop the transportation of the paper P1. The timing when the moving speed Vx exceeds the third threshold T3 is later than the feeding of the feeding roller 14 is stopped (P1) in FIG. 9, and in a case in which the paper P1 is transported by the pair of transporting rollers 16, driving of the pair of transporting rollers 16 is stopped, and thereby making it possible to stop the transportation of the paper P1.

In the embodiment, the "third threshold T3" is a moving speed of the paper in the width direction in order to determine whether or not the paper passes obliquely, and a specific value thereof is appropriately set by a person skilled in the art in accordance with a configuration, a size, and the like of the apparatus.

In addition, as "the physical quantity relating to the movement of the paper" for setting the "third threshold T3", in addition to the moving speed Vx of the paper in the width direction, for example, a moving distance or an acceleration rate in the width direction can be used.

Regarding Control 2

The "control 2" is a control in which a transportation failure of the paper is detected based on the movement of the paper P in the medium feeding direction (Y axis direction) detected by the medium movement detecting portion 21, and the transportation of the paper is stopped in the scanner 1.

For example, as illustrated in FIGS. 10 and 11, a case in which the original document bundle clipped by a stapler is placed on the medium placing portion 11 in a state in which the clipped part H thereof is positioned on the upstream side (rear end side) is considered. The first sheet of the paper from the bottom is set to the paper P1 (illustrated by dotted line), and a next sheet of the paper (second sheet of paper) is set to the paper P2 (illustrated by solid lie).

As illustrated in FIGS. 10 and 11, in a case in which the paper is placed on the medium placing portion 11 so that the clipped part H of the original document bundle is positioned on the upstream side (rear end side), as illustrated in FIG. 15, the first sheet of the paper from the bottom P is fed in a normal state. That is, after the feeding roller 14 starts to feed the paper P1 (the feeding roller starts to feed (P1)), and the distal end of the paper P1 is detected by the second detecting portion 23 (the second detecting portion detects the distal end (P1)), if the distal end of the paper P1 detected by the third detecting portion 24 (the third detecting portion detects the distal end (P1)), the feeding roller 14 stops to feed the paper P1 (the feeding roller stops feeding (P1)).

A section where the movement of the paper P1 is detected by the medium movement detecting portion 21 is set to the "moving section (P1)" of the paper P1 in the medium feeding direction (Y axis direction) by the medium movement detecting portion 21.

The "moving section (P1)" in FIG. 16 is substantially the same as the "moving section (P1)" in FIG. 5 which illustrates a normal feeding state of the paper.

Also, the section may be a temporal section (time when the medium movement detecting portion 21 detects the movement of the paper), or may be a distance section where the paper is fed (a distance where the paper is moved while the medium movement detecting portion 21 detects the movement of the paper). In the embodiment, the distance section is used as the section.

If the paper P1 is continuously transported, the second sheet of the paper P2 (all sheets subsequent to the second sheet of the paper in a case in which three or more sheets of the original document bundle are stapled) may be reversed and moved along the paper P1 as illustrated in FIG. 12.

If the paper P1 is further fed in a state of FIG. 12, as illustrated in FIGS. 13 and 16, the paper P2 is completely reversed. At this time, since the clipped part H is close to one side of the paper in the width direction, the paper P2 is inclined as illustrated in FIG. 16 and is fed along with the paper P1. Also, after the rear end of the paper P1 passes through the medium movement detecting portion 21 as illustrated in FIGS. 13 and 16, as illustrated in FIGS. 14 and 17, before the distal end of the paper P2 approaches the medium movement detecting portion 21, the medium movement detecting portion 21 is in a state of not detecting the movement of the paper. A section where the medium movement detecting portion 21 does not detect the movement of the paper (section illustrated by reference number R in FIG. 15) is set to a "stop section".

Also, the "stop" of the paper means a case in which the paper approaching a detecting region of the medium movement detecting portion 21 is stopped, and also means a case in which movement of the paper is not detected because there is no paper.

Continuously, when the distal end of the paper P2 approaches the medium movement detecting portion 21, the medium movement detecting portion 21 detects movement of the paper P2. A section where the movement of the paper P2 is detected by the medium movement detecting portion 21 is referred to as the "moving section (P2)" of the paper P2 in the medium movement detecting portion 21 in the medium feeding direction (Y axis direction).

Here, even in a case in which the paper is normally fed (FIG. 5) as described above, the "moving section (P1)", the "stop section", and the "moving section (P2)" are detected by the medium movement detecting portion 21. In FIG. 5, a timing of moving from the "stop section" to the "moving section (P2)" is a timing when the rear end of the paper P1 is detected by the second detecting portion 23, and the feeding roller 14 starts to feed the paper P2. Also, a movement distance of the paper P1 in the medium feeding direction (+Y direction) during the "stop section" at the time of normal feeding of the paper is set to a distance R1 (FIG. 5).

However, since the original document bundle in a case in which a rear end is clipped by the clipped part H is fed (FIG. 15), and the paper P2 is transported along with the paper P1, as illustrated in FIGS. 14 and 17, the paper P2 may be detected by the medium movement detecting portion 21 earlier than the rear end of the paper P1 which is detected by the second detecting portion 23. That is, before the timing when the feeding roller 14 starts to feed the paper P2 (feeding starts in FIG. 5 (P2)), the paper P2 is started to be moved. Therefore, in FIG. 15, a movement distance R of the paper P1 in the medium feeding direction (+Y direction) between the "stop sections" detected by the medium movement detecting portion 21 may be shorter than the distance R1 at the time of normal feeding (FIG. 5).

In such a case described above, the controller 19 receives the detected information by the medium movement detecting portion 21, and controls the jot to be stopped in a case in which the distance R in the "stop section" when the medium movement detecting portion 21 sequentially detects the "moving section (P1)", the "stop section", and the "moving section (P2)" of the paper P in the medium feeding direction (Y axis direction) is shorter than a predetermined first threshold R1 (distance R1 in "stop section" at the time of normal feeding in FIG. 5.

That is, in FIG. 15, at a timing of moving from the "stop section" to the "moving section (P2)", rollers (feeding roller 14, a pair of transporting rollers 16, and a pair of discharging rollers 17) relating to transportation of the paper are stopped to be driven.

Accordingly, in a case in which the distance R of the "stop section" is shorter than the first threshold R1, that is, since the job is stopped by early detecting the feeding state which is not detected during a normal feeding (FIG. 5) (a state in which the subsequent paper P2 along with the paper P1 which is fed in advance is fed unintendedly due to the binding portion H of the stapled original document bundle as illustrated in FIG. 15), it is possible to suppress generation of damage in the paper P1 and paper subsequent to the paper P2 to be bound with the paper P1 when a transportation failure occurs.

In addition, for example, a punch hole for filing may be opened in the paper. As illustrated in FIG. 18, in a case of the paper P1 (illustrated by dotted line in FIG. 18) in which a plurality of punch holes N is provided in the width direction, when the paper P1 is normally fed, and a punch hole N1 among the plurality of punch holes N at a position overlapping the medium movement detecting portion 21 in the medium feeding direction passes through the medium movement detecting portion 21, the medium movement detecting portion 21 detects the second sheet of the paper P2 (in stop because it is not fed) through the punch hole N1. That is, a section where the punch hole N1 passes through the medium movement detecting portion 21 is detected by the medium movement detecting portion 21 as the "stop section".

Therefore, a short "stop section" corresponding to a section where the punch hole N1 passes through the medium movement detecting portion 21 between the "moving sections (P1)" at the time of normally feeding the paper P1 (FIG. 5) is detected. A distance of the short "stop section" is the distance R2 (FIG. 19) corresponding to a diameter R2 (FIG. 18) of a punch hole N (N1) in the Y axis direction.

That is, as illustrated in FIG. 19, the "stop section" of the distance R2 is detected between the "moving section (first half of P1)" which is a section where the medium movement detecting portion 21 detects a downstream side of the paper P1 rather than the punch hole N1 and the "moving section (latter half of P1)" which is a section where the medium movement detecting portion 21 detects an upstream side of the paper P1 rather than the punch hole N1.

In a case in which the punch hole N1 is present in the paper P1 to be fed, since the medium movement detecting portion 21 detects the next paper P2 on the paper P1 through the punch hole N1 in a part corresponding to the punch hole N1, apparently, the medium movement detecting portion 21 detects the "stop section".

However, generally, since the punch hole N1, which is a hole for filing, is small, the "stop section" detected by the medium movement detecting portion 21 in the part corresponding to the punch hole N1 is a significantly short section (distance R2) and is shorter than the first threshold R1 for detecting feeding (transportation failure) of a stapled medium bundle. Therefore, when the controller 19 performs controlling with reference to only the first threshold R1, even a normal feeding of the paper P1 having the punch hole N (N1) is set to an abnormal feeding state which causes a transportation failure to be generated, and thus a job is stopped.

Therefore, in order to suppress or avoid a concern in which the normal feeding of the paper having a small hole such as the punch hole N is determined as the abnormal feeding, the controller 19 is capable of referring a second threshold R2 shorter than the first threshold R1, and in a case in which the "stop section" pinched between the "moving sections" (between "moving section (first half of P1)" and "moving section (latter half of P1)" in FIG. 19) is equal to or smaller than the second threshold R2, the job is continued.

Thus, it is possible to suppress false detection of the normal feeding of the paper having a small hole as the abnormal feeding.

Also, even in a case in which the paper P1 floats due to wrinkles or folds other than the punch hole N and is not detected by the medium movement detecting portion 21, or a case in the paper P1 is partially formed of a material which is not detected by the medium movement detecting portion 21, the short "stop section" may be present.

Even in such a case, it is possible to avoid detection as the abnormal feeding and to set the detection as the normal feeding.

In the medium feeding device 10 of the embodiment, the medium movement detecting portion 21 is configured to be capable of detecting the movement in both the medium feeding direction (Y axis direction) and the width direction (X axis direction), and the controller 19 is capable of performing the "control 1" and the "control 2" described above, but for example, the controller 19 can be configured to perform the "control 1" by including the medium movement detecting portion which detects only the movement of the paper P in the width direction. In addition, the controller 19 can also be configured to perform the "control 2" by including the medium movement detecting portion which detects only the movement of the paper P in the feeding direction.

Second Embodiment

Figure 20:
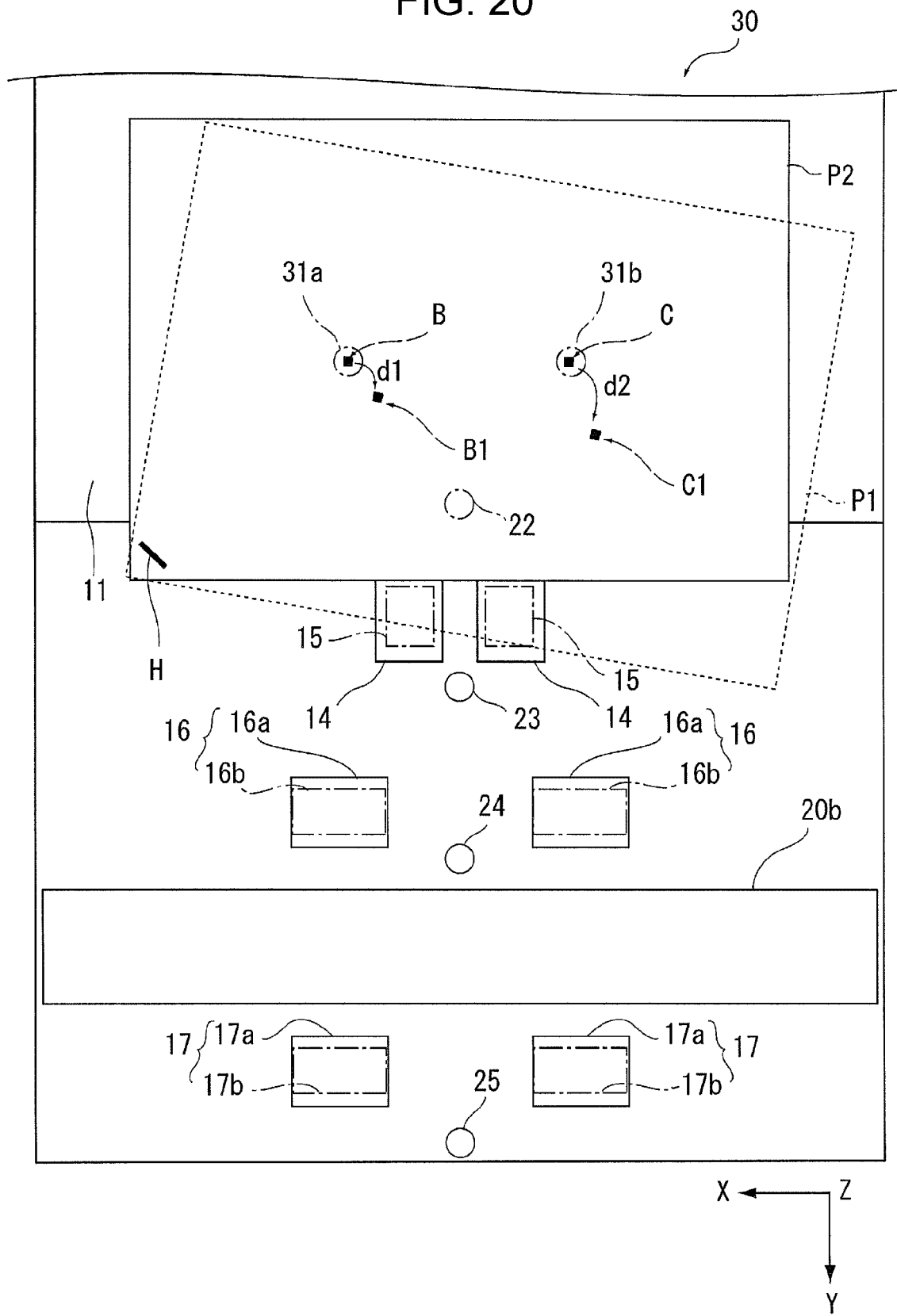
FIG. 20 is a view describing the feeding of the paper in a medium feeding device of a second embodiment.
Figure 21:
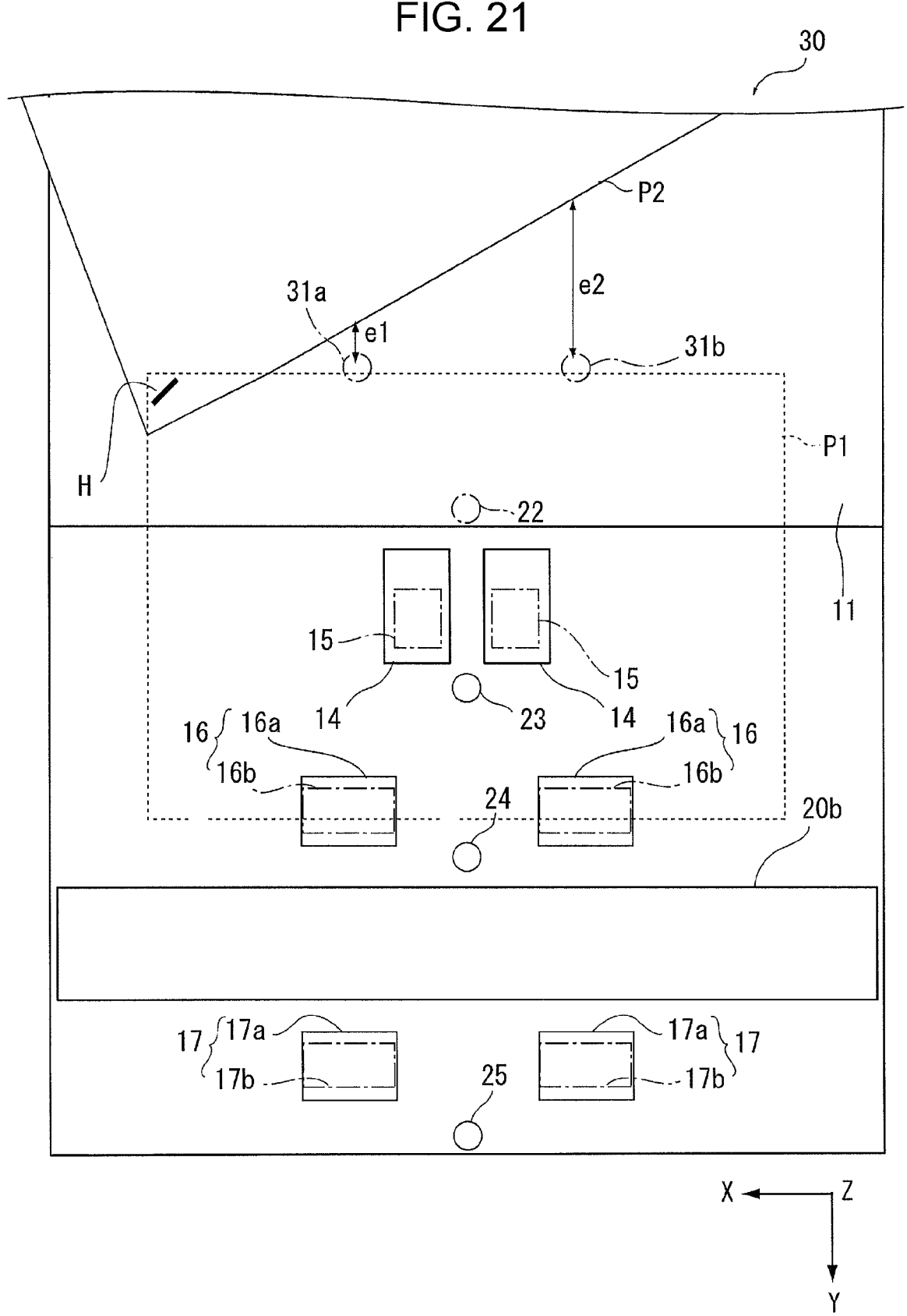
FIG. 21 is a view describing another example of the paper feeding in the medium feeding device of the second embodiment.

Regarding a second embodiment, another example of the medium feeding device will be described with reference to FIGS. 20 and 21. FIG. 20 is a view describing paper feeding in the medium feeding device according to the second embodiment. FIG. 21 is a view describing another example of the paper feeding in the medium feeding device according to the second embodiment.

In the embodiment, the same number is given to the same configuration as that of the first embodiment, and description thereof will be omitted. In addition, in addition to FIGS. 20 and 21, the drawings used to describe the first embodiment are appropriately referred to.

As illustrated in FIGS. 20 and 21, the medium feeding device 30 according to the embodiment includes a pair of the medium movement detecting portions which is provided with a gap therebetween so as to be positioned on both ends of the feeding roller 14, a first medium movement detecting portion 31a, and a second medium movement detecting portion 31b. The +X direction side is set to the first medium movement detecting portion 31a, and the −X direction side is set to the second medium movement detecting portion 31b.

Here, for example, in a case in which the original document bundle clipped by a stapler is placed on the medium placing portion 11 in a state in which the clipped part H is positioned toward the downstream side (distal end side), as illustrated in FIG. 20, the clipped part H side (+X direction side) is hardly moved, the paper P1 (illustrated by dotted line in FIG. 20) is fed to an opposite side (−X direction side) distant from the clipped part H side, and thus when FIG. 20 is seen in plain view, the paper is rotary-moved in a counterclockwise direction based on a vicinity of the clipped part H.

That is, before feeding the paper P1, a detection position B by the first medium movement detecting portion 31a and a detection position C by the second medium movement detecting portion 31b are respectively moved in detection position B1 and a detection position C1 after feeding the paper P1.

Therefore, as the above description of the control 1 of the first embodiment, the first medium movement detecting portion 31a and the second medium movement detecting portion 31b detect the movement of the paper P1 which is not detected at the time of the normal feeding of the paper in the X axis direction.

Also, a movement amount d2 of the paper P1 being detected by the second medium movement detecting portion 31b far from the clipped part H which is a rotation center of the paper P1 increases more than the movement amount d1 of the paper P1 being detected by the first medium movement detecting portion 31a close to the clipped part H.

The controller 19 controls for stopping the job, in a case in which a difference between a physical quantity relating to the movement of the paper detected by the first medium movement detecting portion 31a and a physical quantity relating to the movement of the paper detected by the second medium movement detecting portion 31b exceeds a predetermined threshold. As the physical quantity relating to the movement of the paper, a moving speed, a movement distance, an acceleration rate at the time of moving, and the like are exemplified.

Accordingly, it is possible to detect a transportation failure of the paper, particularly, the rotation of the paper, and thus damage to be generated in the paper can be more reliably suppressed.

Also, the physical quantity to be compared may be any one of a physical quantity relating to movement of the paper in the width direction, a physical quantity relating to movement of the paper in the feeding direction, and a physical quantity relating to movement of the paper in both the width direction and the feeding direction. In a case in which the paper is rotated, each difference between the physical quantities relating to the movement in the feeding direction is significant, and thus it is desirable that at least a difference between the physical quantities relating to the movement in the feeding direction is used. In addition, the detectable rotation of the paper is not limited to a case in which the detectable rotation is generated in the stapled original document bundle.

In addition, without comparing the physical quantities relating to the movement of the paper detected by the first medium movement detecting portion 31a and the second medium movement detecting portion 31b, in a case in which the first medium movement detecting portion 31a and the second medium movement detecting portion 31b detect the movement of the paper in the width direction, the job can be stopped.

In addition, in a case in which the original document bundle clipped by a stapler is placed on the medium placing portion 11 in a state in which the clipped part H is positioned toward the upstream side (rear end side), as illustrated in FIG. 21, a distal end of the subsequent paper P2 (illustrated by solid line) along with the paper P1 (illustrated by dotted line) which is transported in advance may be inclinedly fed.

When the paper P2 along with the paper P1 is fed, as above description of the control 2 of the first embodiment with reference to FIG. 15, the first medium movement detecting portion 31a and the second medium movement detecting portion 31b respectively detect the "moving section (P1)", the "stop section", and the "moving section (P2)".

However, when the distal end of the paper P2 is inclined, since the timing when the first medium movement detecting portion 31a detects the distal end of the paper P2 and a timing when the second medium movement detecting portion 31b detects the distal end of the paper P2 are different from each other, a difference is also generated between the "stop section" detected by the first medium movement detecting portion 31a and the "stop section" detected by the second medium movement detecting portion 31b.

Also, the "stop section" detected by the first medium movement detecting portion 31a corresponds to the distance e1 from the distal end of the paper P2 to the first medium movement detecting portion 31a in FIG. 21 which is a drawing illustrating a timing when the rear end of the paper P1 (generally in the normal feeding state) is pulled out from a detecting region by the first medium movement detecting portion 31a and the second medium movement detecting portion 31b, and the "stop section" detected by the second medium movement detecting portion 31b corresponds to the distance e2 from the distal end of the paper P2 to the second medium movement detecting portion 31b in FIG. 21.

In such a case described above, the controller 19 controls the jot to be stopped in a case in which a difference between the "stop section" detected by the first medium movement detecting portion 31a and the "stop section" detected by the second medium movement detecting portion 31b exceeds a predetermined threshold. Accordingly, it is possible to more reliably detect a transportation failure of the paper.

Also, the difference of the "stop sections" means a difference between distances or lengths indicated by time of the "stop sections", and also means a difference between start or finish timings of the "stop sections" even when the lengths of the "stop sections" are the same as each other.

In addition, with reference to detected information relating to a larger physical quantity relating to the movement of the paper than the other to be detected by one of the first medium movement detecting portion 31a and the second medium movement detecting portion 31b is used, the control 1 described in the first embodiment can also be performed.

Hitherto, the first embodiment and the second embodiment are described, but the invention is not limited to the embodiments, various modifications can be made within a range of the invention described in claims, and it is needless to say that the modifications are also included in the range of the invention.

For example, in the first embodiment and the second embodiment, the scanner 1 in a center paper feeding manner is described, but for example, the configuration of the invention can be applied to a scanner in an offset paper feeding manner having a configuration in which one edge guide 12 is fixed to the medium placing portion 11 and the other edge guide 12 is moved to the medium placing portion 11.

In addition, the medium feeding device 10 (first embodiment) and the medium feeding device 30 (second embodiment) can also be provided in, for example a recording apparatus represented by a printer, in addition to the scanner (image reading apparatus).

The entire disclosure of Japanese Patent Application No. 2017-191025, filed Sep. 29, 2017 is expressly incorporated by reference herein.

What is claimed is:

1. A medium feeding device comprising:
a medium placing portion on which a medium is placed;
a feeding roller configured to feed the medium placed on the medium placing portion by coming into contact with a surface of the medium facing the medium placing portion and being rotated;
a medium movement detecting portion that is positioned in a placing region of the medium placing portion where the medium to be fed by the feeding roller can be placed, the medium movement detecting portion being configured to detect movement of the medium being fed by the feeding roller in a medium feeding direction, the medium movement detecting portion detecting movement of the medium at a location disposed in the placing region and spaced from edge guides that guide edges of the medium moved in the medium feeding direction, the medium movement detecting portion optically detects movement within a two-dimensional plane; and
a controller configured to stop feeding of the medium in a case in which a stop section is shorter than a predetermined first threshold when a moving section, the stop section, and a moving section of the medium in the medium feeding direction are detected by the medium movement detecting portion in this order based on a detected result by the medium movement detecting portion, wherein the stop section is a section where a moving speed of the medium is zero.

2. The medium feeding device according to claim 1, wherein the controller refers to a second threshold that is shorter than the first threshold and continues feeding of the medium in a case in which the stop section is equal to or less than the second threshold.

3. An image reading apparatus comprising:
a reading unit that reads a medium; and
the medium feeding device according to claim 2 that feeds the medium toward the reading unit.

4. The medium feeding device according to claim 1,
wherein the medium movement detecting portion is configured to be capable of detecting both movement of the medium in the medium feeding direction and movement in a width direction intersecting the medium feeding direction, and
wherein the controller stops feeding of the medium in a case in which a physical quantity relating to the movement of the medium in the width direction based on the detected result by the medium movement detecting portion exceeds a predetermined third threshold.

5. An image reading apparatus comprising:

a reading unit that reads a medium; and the medium feeding device according to claim 4 that feeds the medium toward the reading unit.

6. The medium feeding device according to claim 1, wherein a pair of the medium movement detecting portions is provided with a gap therebetween in the width direction intersecting the medium feeding direction;

wherein the pair of the medium movement detecting portions is respectively set as a first medium movement detecting portion and a second medium movement detecting portion, and wherein the controller stops a job in a case in which a difference between the stop section being detected by the first medium movement detecting portion and the stop section being detected by the second medium movement detecting portion exceeds a predetermined threshold.

7. An image reading apparatus comprising:

a reading unit that reads a medium; and the medium feeding device according to claim 1 that feeds the medium toward the reading unit.

8. The medium feeding device according to claim 1, wherein the medium movement detecting portion is configured to detect movement of the medium being fed by the feeding roller toward opposite sides of a width direction intersecting the medium feeding direction.

9. The medium feeding device according to claim 1, wherein the movement detected by the medium movement detecting portion includes movement of the medium toward opposite sides of a width direction intersecting a medium feeding direction and in the feeding direction.

\* \* \* \* \*